(12) United States Patent
Miyasaka et al.

(10) Patent No.: US 8,437,238 B2
(45) Date of Patent: *May 7, 2013

(54) DIFFRACTION GRATING, ABERRATION CORRECTION ELEMENT AND OPTICAL HEAD DEVICE

(75) Inventors: Koji Miyasaka, Fukushima (JP); Hiromasa Sato, Fukushima (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/556,507

(22) Filed: Jul. 24, 2012

(65) Prior Publication Data

US 2012/0287767 A1 Nov. 15, 2012

Related U.S. Application Data

(63) Continuation of application No. 13/021,871, filed on Feb. 7, 2011, now Pat. No. 8,279,737, which is a continuation of application No. PCT/JP2009/063972, filed on Aug. 6, 2009.

(30) Foreign Application Priority Data

Aug. 7, 2008 (JP) ................................. 2008-203956

(51) Int. Cl.
| | |
|---|---|
| *G11B 7/00* | (2006.01) |
| *G11B 7/135* | (2006.01) |
| *G02B 5/18* | (2006.01) |
| *G02B 13/00* | (2006.01) |

(52) U.S. Cl.
USPC ............ 369/112.03; 369/109.01; 369/109.02; 369/110.03; 369/112.04; 369/112.07; 369/112.12; 359/566; 359/642; 359/724

(58) Field of Classification Search ............. 369/112.03, 369/109.01, 109.02, 110.03, 112.04, 112.07, 369/112.12; 359/566, 642, 724
See application file for complete search history.

(56) References Cited

U.S. PATENT DOCUMENTS

| 6,891,147 B2 | 5/2005 | Goto et al. |
| 2003/0123371 A1* | 7/2003 | Nishiyama et al. ...... 369/112.17 |

(Continued)

FOREIGN PATENT DOCUMENTS

| JP | 11-23819 | 1/1999 |
| JP | 2003-207714 | 7/2003 |

(Continued)

OTHER PUBLICATIONS

International Search Report issued Sep. 15, 2009 in PCT/JP2009/063972 filed Sep. 7, 2009.

*Primary Examiner* — Aneeta Yodichkas
(74) *Attorney, Agent, or Firm* — Oblon, Spivak, McClelland, Maier & Neustadt, L.L.P.

(57) ABSTRACT

There is provided a diffraction grating including a convex portion and a concave portion which are used for lights having different wavelengths $\lambda_1$, $\lambda_2$ and $\lambda_3$ and are alternately disposed on at least one surface of a substrate with a predetermined pitch. An average refractive index of the convex portion is smaller than an average refractive index of the concave portion. A phase difference in the lights having the wavelength $\lambda_1$ which transmit the convex portion and the concave portion and a phase difference in the lights having the wavelength $\lambda_2$ which transmit the convex portion and the concave portion are both substantially the integral multiple of $2\pi$, and a phase difference in the lights having the wavelength $\lambda_3$ which transmit the convex portion and the concave portion is substantially the non-integral multiple of $2\pi$.

20 Claims, 13 Drawing Sheets

U.S. PATENT DOCUMENTS

| | | |
|---|---|---|
| 2003/0174631 A1 | 9/2003 | Nishiyama et al. |
| 2005/0213444 A1 | 9/2005 | Murakami et al. |
| 2005/0226122 A1* | 10/2005 | Ooi et al. .................. 369/112.05 |
| 2008/0316600 A1 | 12/2008 | Koyanagi et al. |
| 2009/0190458 A1 | 7/2009 | Nashi |
| 2011/0199884 A1 | 8/2011 | Miyasaka et al. |

FOREIGN PATENT DOCUMENTS

| | | |
|---|---|---|
| JP | 2005-158217 | 6/2005 |
| JP | 2006-73042 | 3/2006 |
| JP | 2006-331590 | 12/2006 |
| JP | 2007-149249 | 6/2007 |
| JP | 2007-293938 | 11/2007 |

* cited by examiner (a)

(b)

DIFFRACTION GRATING, ABERRATION CORRECTION ELEMENT AND OPTICAL HEAD DEVICE

CROSS REFERENCE TO RELATED APPLICATIONS

The present application is a continuing application based on U.S. Ser. No. 13/021,871, filed on Feb. 7, 2011, which was a bypass continuation of international application PCT/JP2009/63972, filed on Aug. 6, 2009, and claims the benefit of the filing date of Japanese Application No. 2008-203956, filed on Aug. 7, 2008, the text of each of which is incorporated by reference.

TECHNICAL FIELD

The present invention relates to a diffraction grating, an aberration correction element, and an optical head device.

BACKGROUND ART

An optical head device irradiates an optical disk with laser lights and detects its reflection lights, to thereby read information recorded in pits formed on a surface of the optical disk.

In the optical head device, laser lights having different wavelengths are emitted according to the type of optical disk. For example, laser lights having a wavelength band of 405 nm are used in HD-DVDs (High Definition Digital Versatile Disk) or BDs (Blu-ray Disk), laser lights having a wavelength band of 660 nm are used in DVDs (Digital Versatile Disk), and laser lights having a wavelength band of 785 nm are used in CDs (Compact Disk). Thus, in order to correspond to different types of optical disks with a single optical head device, it is necessary to mount a laser device which oscillates a wavelength according to the optical disk to the device.

In recent years, for miniaturization of the optical head device, a two-wavelength laser source has been used in which a semiconductor laser which emits laser lights having a wavelength band for DVDs and a semiconductor laser which emits laser lights having a wavelength band for CDs are formed in a single chip. Patent Document 1 discloses a diffraction grating which can be applied to such a light source. Further, Patent Document 2 discloses a phase correction device which is disposed in an optical path of three wavelengths and corrects a phase in a wavelength selecting manner.

RELATED ART DOCUMENTS

Patent Documents

[Patent Document 1] JP-A-2007-293938
[Patent Document 2] JP-A-2003-207714

SUMMARY OF THE INVENTION

Problem that the Invention is to Solve

The diffraction grating disclosed in Patent Document 1 has a configuration in which a material having a low refractive index and a material having a high refractive index are alternately arranged on an exit surface of a substrate. The ratio (W/P) of a width W of the refractive index material formed in a convex shape to a pitch P thereof is set to 0.5 and the depth of the grating is set so that the diffraction efficiency is constant in a wavelength band which ranges from 650 nm to 785 nm. Thus, it is possible to reduce the wavelength dependency in the above-described wavelength band.

The phase correction device disclosed in Patent Document 2 has a pattern structure of which the section is a step shape in which a light path length of one step is corresponding to the integral multiple of one or two of three lights having different wavelengths and is corresponding to the non-integral multiple of the remaining lights having the other wavelengths. In particular, the three wavelengths include the combination of 400 nm to 410 nm, either one of 635 nm and 650 nm, and 780 nm.

However, the diffraction grating disclosed in Patent Document 1 corresponds to two wavelengths. That is, this grating can perform recording and reading of information for CDs and DVDs by using a two-wavelength laser source, but cannot perform recording and reading of information corresponding to HD-DVDs, BDs or the like. Patent Document 1 mentions that the grating can be applied to a wavelength of 405 nm by changing the depth of the grating made of a low refractive index material and a high refractive index material, but does not disclose the detailed structure thereof. On the other hand, it is desired to provide a diffraction element which has a high degree of design freedom with respect to laser lights having the three wavelength bands and can allow diffraction in a wavelength selecting manner.

Further, the phase correction device in Patent Document 2 compatibles to three wavelengths, but the step has a pattern formed of a single material such as glass and is set so that the difference between a refractive index of the material and a refractive index of air which contacts the material is a desired value. Thus, in a case where the combination of one or two wavelengths, among three wavelengths, in which the step is the integral multiple of the wavelength, is changed, both the material by which the step is formed and the value of the step should be changed, which limits the degree of design freedom.

An object of the invention is to provide a diffraction grating and an aberration correction element which are capable of corresponding to three wavelengths with a high degree of design freedom, and an optical head device which has the diffraction grating and/or the aberration correction element.

Other objects and advantages of the invention will be apparent from the following description.

Means for Solving the Problem

According to an embodiment of the invention, there is provided a diffraction grating including a convex portion and a concave portion which are used for lights having different wavelengths $\lambda_1$, $\lambda_2$ and $\lambda_3$ and are alternately disposed on at least one surface of a substrate with a predetermined pitch, wherein an average refractive index of the convex portion is smaller than an average refractive index of the concave portion, wherein a phase difference in the lights having the wavelength $\lambda_1$ which transmit the convex portion and the concave portion and a phase difference in the lights having the wavelength $\lambda_2$ which transmit the convex portion and the concave portion are both substantially the integral multiple of $2\pi$, and wherein a phase difference in the lights having the wavelength $\lambda_3$ which transmit the convex portion and the concave portion is substantially the non-integral multiple of $2\pi$.

Further, in the diffraction grating according to this embodiment, it is preferable that the phase difference in the lights having the wavelength $\lambda_1$ which transmit the convex portion and the concave portion and the phase difference in the lights having the wavelength $\lambda_2$ which transmit the convex portion and the concave portion are both substantially zero.

Further, in the diffraction grating according to this embodiment, it is preferable that a first-order diffraction efficiency of the lights having the wavelength $\lambda_3$ is 4% or more.

According to an embodiment of the invention, there is provided a diffraction grating including a convex portion and a concave portion which are used for lights having different wavelengths $\lambda_1$, $\lambda_2$ and $\lambda_3$ and are alternately disposed on at least one surface of a substrate with a predetermined pitch, wherein an average refractive index of the convex portion is smaller than an average refractive index of the concave portion, wherein a phase difference in the lights having the wavelength $\lambda_1$ which transmit the convex portion and the concave portion and a phase difference in the lights having the wavelength $\lambda_2$ which transmit the convex portion and the concave portion are both substantially the non-integral multiple of $2\pi$, and wherein a phase difference in the lights having the wavelength $\lambda_3$ which transmit the convex portion and the concave portion is substantially the integral multiple of $2\pi$.

Further, in the diffraction grating according to the embodiment, it is preferable that the phase difference in the lights having the wavelength $\lambda_3$ which transmit the convex portion and the concave portion is substantially zero.

Further, in the diffraction grating according to the embodiment, it is preferable that a first-order diffraction efficiency of the lights having the wavelength $\lambda_1$ and $\lambda_2$ is 4% or more.

According to an embodiment of the invention, there is provided a diffraction grating including a convex portion and a concave portion which are used for lights having different wavelengths $\lambda_1$, $\lambda_2$ and $\lambda_3$ and are alternately disposed on at least one surface of a substrate with a predetermined pitch, wherein an average refractive index of the convex portion is smaller than an average refractive index of the concave portion, and wherein phase differences of the lights of the wavelengths $\lambda_1$, $\lambda_2$ and $\lambda_3$ which transmit the convex portion and the concave portion are respectively $a_1\pi$, $a_2\pi$ and $a_3\pi$.

$$0 \leq |a_1 - a_2| \leq 0.2$$

$$0.2 < |a_3 - a_1|$$

$$0.2 < |a_3 - a_2| \quad \text{(Formula 1)}$$

According to the above configuration, the above relationship is established

Further, in the diffraction grating according to this embodiment, the convex portion may be formed of a material which includes $SiO_2$ as a main component, and the concave portion may be formed of a material which includes $TiO_2$, $Nb_2O_5$, or $Ta_2O_5$ as a main component.

Further, in the diffraction grating according to this embodiment, the convex portion may be formed of a single-layer film which includes $SiO_2$ as a main component, and the concave portion may be formed of a multi-layer film in which a material which includes $SiO_2$ as a main component and a material which includes $TiO_2$, $Nb_2O_5$, or $Ta_2O_5$ as a main component are alternately stacked. In this case, it is preferable that the multi-layer film is an antireflection film.

Further, in the diffraction grating according to this embodiment, the convex portion and the concave portion may be formed of a multi-layer film in which a material which includes $SiO_2$ as a main component and a material which includes $TiO_2$, $Nb_2O_5$, or $Ta_2O_5$ as a main component are alternately stacked. In this case, the multi-layer film may be an antireflection film.

According to an embodiment of the invention, there is provided an aberration correction element including a convex portion and a concave portion which are used for lights having different wavelengths $\lambda_1$, $\lambda_2$ and $\lambda_3$ and are disposed on at least one surface of a substrate, wherein an average refractive index of the convex portion is smaller than an average refractive index of the concave portion, wherein a phase difference in the lights having the wavelength $\lambda_1$ which transmit the convex portion and the concave portion and a phase difference in the lights having the wavelength $\lambda_2$ which transmit the convex portion and the concave portion are both substantially the integral multiple of $2\pi$, and wherein a phase difference in the lights having the wavelength $\lambda_3$ which transmit the convex portion and the concave portion is substantially the non-integral multiple of $2\pi$, and an aberration component included in the lights having the wavelength $\lambda_3$ is corrected.

Further, in the aberration correction element according to this embodiment, it is preferable that the phase difference in the lights having the wavelength $\lambda_1$ which transmit the convex portion and the concave portion and the phase difference in the lights having the wavelength $\lambda_2$ which transmit the convex portion and the concave portion are both substantially zero.

According to an embodiment of the invention, there is provided an aberration correction element including a convex portion and a concave portion which are used for lights having different wavelengths $\lambda_1$, $\lambda_2$ and $\lambda_3$ and are disposed on at least one surface of a substrate, wherein an average refractive index of the convex portion is smaller than an average refractive index of the concave portion, wherein a phase difference in the lights having the wavelength $\lambda_1$ which transmit the convex portion and the concave portion and a phase difference in the lights having the wavelength $\lambda_2$ which transmit the convex portion and the concave portion are both substantially the non-integral multiple of $2\pi$, and wherein a phase difference in the lights having the wavelength $\lambda_3$ which transmit the convex portion and the concave portion is substantially the integral multiple of $2\pi$, and aberration components included in the lights having the wavelengths $\lambda_1$ and $\lambda_2$ is corrected.

Further, in the aberration correction element according to this embodiment, it is preferable that the phase difference in the lights having the wavelength $\lambda_3$ which transmit the convex portion and the concave portion is substantially zero.

Further, in the aberration correction element according to this embodiment, the convex portion and the concave portion may be alternately arranged so that two lines which are approximately orthogonal to each other form boundary lines and an intersection of the two lines is an optical axis.

Further, in the aberration correction element according to this embodiment, the convex portion and the concave portion may be alternately arranged so that two lines which are approximately parallel to each other form boundary lines and an optical axis is included in a line which bisects a gap obtained by the two lines.

Further, in the aberration correction element according to this embodiment, when a first straight line which includes the optical axis and a second straight line which is orthogonal to the first straight line and includes the optical axis are given, at least one of the convex portion and the concave portion may have a region of island shapes which does not cross the first straight line, when the first straight line is an axis of symmetry, the convex portion and the concave portion may be all overlapped, and when the second straight line is an axis of symmetry, the convex portions may be all arranged to be overlapped with each other and the concave portions may be all arranged to be overlapped with each other.

Further, in the aberration correction element according to this embodiment, the convex portion and the concave portion may be alternately arranged in a circular region centering on the optical axis and a plurality of annular regions surrounding the circular region.

Further, in the aberration correction element according to this embodiment, the convex portion may be formed of a material which includes $SiO_2$ as a main component, and the concave portion may be formed of a material which includes $TiO_2$, $Nb_2O_5$, or $Ta_2O_5$ as a main component.

Further, in the aberration correction element according to this embodiment, the convex portion and the concave portion may be formed of a multi-layer film in which a material which includes $SiO_2$ as a main component and a material which includes $TiO_2$, $Nb_2O_5$, or $Ta_2O_5$ as a main component are alternately stacked. In this case, the multi-layer film may be an antireflection film.

According to an embodiment of the invention, there is provided an optical head device including: a light source which emits lights having three different types of wavelengths; an objective lens which focuses the lights emitted from the light source onto an optical recording medium; and a detector which detects the emitted lights reflected from the optical recording medium, wherein the diffraction grating and/or the aberration correction element is disposed in an optical path between the light source and the objective lens.

Advantage of the Invention

The invention can provide a diffraction grating which is capable of corresponding to three wavelengths. Further, the invention can provide an aberration correction element which is capable of corresponding to three wavelengths.

Further, the invention provides an optical head device which can be applied to any optical recording medium in which three corresponding wavelengths are different.

MODE FOR IMPLEMENTING THE INVENTION (Diffraction Grating of the Invention)

Figure 1:
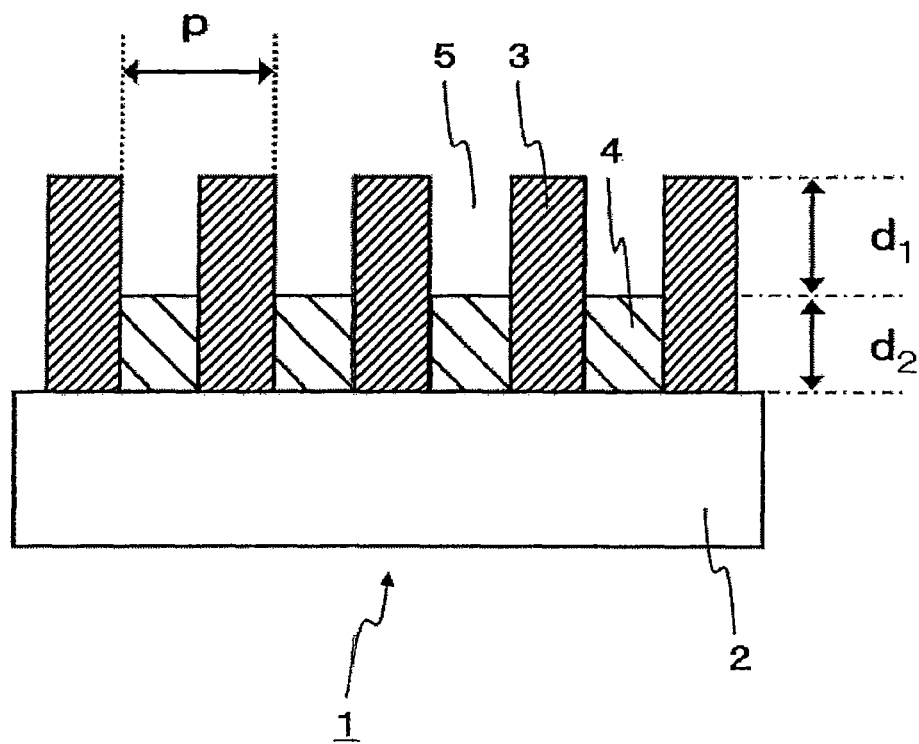
FIG. 1 is a diagram illustrating a basic configuration of a diffraction grating according to an embodiment of the invention.

FIG. 1 is a diagram illustrating a basic configuration of a diffraction grating according to an embodiment of the invention.

A diffraction grating 1 includes a convex portion 3 and a concave portion 4 which are alternately disposed with a predetermined pitch on a transparent substrate 2 such as glass. Here, an average refractive index $n_1$ of the convex portion 3 is smaller than an average refractive index $n_2$ of the concave portion 4 and the relationship of $n_1 < n_2$ is established. The substrate 2 is preferably an isotropic transparent substrate, and may also include plastics other than glass. Further, in FIG. 1, the convex portion and the concave portion are disposed on one surface of the substrate 2, but may be disposed on opposite surfaces of the substrate 2. In addition, in FIG. 1, the convex portion 3 and the concave portion 4 may be disposed on one side where lights from a light source are incident to the diffraction grating 1 or on a side where the lights exit from the diffraction grating 1.

The convex portion 3 may be formed of a material of which a main component is $SiO_2$, and the concave portion 4 may be formed of a material of which a main component is $Ta_2O_5$. Further, the convex portion 3 and the concave portion 4 may be formed as a single-layer film including these materials. However, the convex portion 3 may be formed as a single-layer film of which a main component is $SiO_2$, and the concave portion 4 may be formed as a multi-layer film in which the material of which a main component is $SiO_2$ and the material of which a main component is $Ta_2O_5$ are alternately stacked. By forming the concave portion 4 as the multi-layer film, it is possible to adjust the average refractive index of the concave portion 4 to a desired value. In particular, as described later, if the concave portion 4 is formed as a multi-layer film which functions as an antireflection film, it is possible to prevent the loss of diffracted lights due to reflection while realizing the desired average refractive index. Further, the convex portion 3 and the concave portion 4 of the diffraction grating 1 is described, and it is possible to obtain a desired optical characteristic using the same material with respect to a convex portion and a concave portion of an aberration correction element which will be described later.

Generally, in a case where lights having a wavelength λ is perpendicularly incident to a transparent medium, a reflectance R is primarily determined by a refractive index $n_i$ of an incident medium and a refractive index $n_s$ of an exit medium and is expressed by the following formula.

(Formula 2)

$$R = (n_i - n_s)^2 / (n_i + n_s)^2 \quad (I)$$

On the other hand, in a case where a thin film having a refractive index n and a film thickness h is disposed between the two mediums, due to the multiple reflection effect occurring on a boundary surface between the thin film and each medium, the reflectance R becomes as follows. Here, $\delta = (2\pi n h)/\lambda$.

(Formula 3)

$$R = \{n^2(n_i - n_s)^2 \cos^2\delta + (n_i n_s - n^2)^2 \sin^2\delta\} / \{n^2(n_i + n_s)^2 \cos^2\delta (n_i n_s + n^2)^2 \sin^2\delta\} \quad (II)$$

From the formula (II), (Formula 4)

$$nh = (m+1)\lambda/2 \ (m=0, 1, 2, \ldots) \qquad \text{(III)}$$

in the case of $n_f < n < n_s$, the reflectance R is the maximum value indicated by the formula (I), and in the case of $n_f < n > n_s$, the reflectance R is the minimum value indicated by the formula (I). That is, in the case of $n_f < n < n_s$, the thin film functions as the antireflection film, and in the case of $n_f < n > n_s$, the thin film functions as a reflection gain film. Thus, in the case of $n_f < n > n_s$, if the single-layer thin film is disposed, there is a possibility that the reflectance is increased compared with a case where the thin film is not disposed. In this case, even though an increase in the reflectance is desired to be suppressed by adjustment of the film thickness h, there is a limit in the adjustment of the film thickness h due to the condition of the formula (III).

As a method of reducing the reflectance in the wavelength λ while securing the degree of freedom of the film thickness h, a method of replacing the single-layer thin film with the multi-layer film is exemplified. For example, in the diffraction grating according to the present embodiment, in a case where the convex portion is formed as a single-layer film of $S_iO_2$ and the concave portion is formed as a multi-layer film where $SiO_2$ and $Ta_2O_5$ are alternately stacked, the diffraction efficiency is determined by the thickness of $Ta_2O_5$. Thus, the multi-layer film is designed by an automatic design using the thickness of $Ta_2O_5$ as a predetermined value. As an automatic design method, for example, there is proposed a method of finding a configuration suitable for conditions by determining the thickness of each layer by generating random numbers and by calculating the transmittance of the multi-layer film, a method of calculating the difference between the transmittance of the multi-layer film and a desired transmittance while changing the thickness of each layer from the initial state and finding a configuration in which the difference is within a predetermined range (gradient method), or the like. As a method of obtaining optical characteristics such as a reflectance, a transmittance and the like of the multi-layer film, there is known a characteristic matrix method calculated from a boundary condition of an electromagnetic field.

The diffraction grating according to the invention is manufactured as follows, for example.

Firstly, a transparent glass substrate is prepared and a $SiO_2$ film is formed by using a film formation technique such as a vacuum deposition method, a sputtering method or the like on the glass substrate. Then, the $SiO_2$ film is patterned by a photolithography method to thereby form a convex portion. Thereafter, in a state where a resist film remains on the $SiO_2$ film, a $Ta_2O_5$ film is formed by using the film formation technique such as the vacuum deposition method, the sputtering method or the like. Then, by lifting off the resist film, a concave portion made of the $Ta_2O_5$ film is formed. Thus, the diffraction grating as shown in FIG. 1 is obtained.

Further, the diffraction grating according to the invention may be manufactured as follows.

Firstly, the resist film is formed on quartz glass using the photolithography method. Then, the quartz glass is patterned using the resist film as a mask to thereby form a convex portion. Thereafter, the $Ta_2O_5$ film is formed using the sputtering method and then the resist film is removed according to the lift-off method, to thereby form a concave portion.

According to a diffraction grating according to the first aspect of the invention, a phase difference in lights having a wavelength $\lambda_1$ which transmit the convex portion and the concave portion and a phase difference in lights having a wavelength $\lambda_2$ which transmit the convex portion and the concave portion are both substantially the integral multiple of $2\pi$, and a phase difference in lights having a wavelength $\lambda_3$ which transmit the convex portion and the concave portion is the non-integral multiple of $2\pi$.

With such a configuration, the diffraction may not occur or may occur under a certain ratio with respect to the lights of the wavelength $\lambda_1$ and the wavelength $\lambda_2$, but the diffraction may occur with respect to the lights of the wavelength $\lambda_3$. In this case, a first-order diffraction efficiency of the lights of the wavelength $\lambda_3$ is preferably 4% or more, more preferably 5% or more, and in particular preferably 6% or more.

According to a diffraction grating according to the second aspect of the invention, a phase difference in lights having a wavelength $\lambda_1$ which transmit the convex portion and the concave portion and a phase difference in lights having a wavelength $\lambda_2$ which transmit the convex portion and the concave portion are both substantially the non-integral multiple of $2\pi$, and a phase difference in lights having a wavelength $\lambda_3$ which transmit the convex portion and the concave portion is substantially the integral multiple of $2\pi$.

With such a configuration, the diffraction may occur with respect to the lights of the wavelength $\lambda_1$ and the wavelength $\lambda_2$, but the diffraction may not occur or may occur under a certain ratio with respect to the lights of the wavelength $\lambda_3$. In this case, a first-order diffraction efficiency of the lights of the wavelength $\lambda_1$ and the wavelength $\lambda_2$ is preferably 4% or more, more preferably 5% or more, and in particular preferably 6% or more.

In this way, according to the diffraction grating of the invention, since the diffraction efficiency can be designed in the three wavelength bands, it is possible to enhance the degree of freedom for a wavelength selectivity of the diffraction efficiency. Specifically, the following effects can be obtained.

In an optical head device, since laser lights are focused on a track which is formed on an information recording surface of an optical disk to rotate the optical disk, the focused laser light beams should not to be out of the track. Thus, a variety of tracking methods is developed. For example, a three-beam method used in reading of information, a push-pull method used in recording of information, or the like, is exemplified. In the latter case, a method of receiving reflected lights from the optical disk using a light receiving element which is bisected in parallel with the track, and obtaining a difference of the bisected reflected lights, in particular, a differential push-pull method of canceling out a signal offset, is well known. The diffraction grating is used in the three-beam method and the differential push-pull method. These methods are the same in that the diffracting grating generates main beams which are zero-order diffracted lights and sub beams which are ±first-order diffracted lights due to the diffraction grating. However, since the diffraction grating in the related art has a diffraction effect with respect to any incident lights of a wavelength band of 790 nm and a wavelength band of 650 nm, for example, there is a possibility that undesired and unnecessary diffracted lights are mixed into a photodetector as stray lights, and thus, it is difficult to record or read information. Further, due to the generation of the unnecessary diffracted lights, a light quantity loss of the zero-order diffracted lights which are required for recording or reading the information is caused to thereby reduce signal lights. On the other hand, according to the diffraction grating of the invention, since the degree of design freedom of the diffraction efficiency for each wavelength is high, the above-described problems can be solved.

As described above, according to the diffraction grating according to the first aspect of the invention, the phase difference in the lights having the wavelength $\lambda_1$ which transmit the convex portion and the concave portion and the phase difference in the lights having the wavelength $\lambda_2$ which transmit the convex portion and the concave portion are substantially the integral multiple of $2\pi$, and the phase difference in the lights having the wavelength $\lambda_3$ which transmit the convex portion and the concave portion is substantially the non-integral multiple of $2\pi$. Further, according to the diffraction grating according to the second aspect of the invention, the phase difference in the lights having the wavelength $\lambda_1$ which transmit the convex portion and the concave portion and the phase difference in the lights having the wavelength $\lambda_2$ which transmit the convex portion and the concave portion are both substantially the non-integral multiple of $2\pi$, and the phase difference in the lights having the wavelength $\lambda_3$ which transmit the convex portion and the concave portion is substantially the integral multiple of $2\pi$. In the former case, it is preferable that the phase difference in the lights having the wavelength $\lambda_1$ and the phase difference in the lights having the wavelength $\lambda_2$ are both zero. On the other hand, in the latter case, it is preferable that the phase difference in the lights having the wavelength $\lambda_3$ is zero. This is because if the phase difference is the integral multiple of $2\pi$, fluctuations of diffraction efficiency due to temperature changes in a laser which is a light source becomes large. Further, generally, if an optical path length difference between the convex portion and the concave portion of the diffraction grating is the integral multiple of the wavelength, it is difficult to completely remove the diffracted lights. However, if the optical path length difference is designed to be zero, the transmittance can be increased compared with the case where the optical path length difference is the integral multiple of the wavelength.

According to a diffraction grating of a third aspect of the invention, an absolute value of the phase difference in the lights having the wavelength $\lambda_1$ which transmit the convex portion and the concave portion and an absolute value of the phase difference in the lights having the wavelength $\lambda_2$ which transmit the convex portion and the concave portion are substantially the same, and the phase difference in the lights having the wavelength $\lambda_3$ which transmit the convex portion and the concave portion is substantially different from the phase difference in the lights having the wavelength $\lambda_1$ and the phase difference in the lights having the wavelength $\lambda_2$. Specifically, the phase differences in the lights having the wavelength $\lambda_1$, the wavelength $\lambda_2$ and the wavelength $\lambda_3$ which transmit the convex portion and the concave portion are respectively $a_1\pi$, $a_2\pi$ and $a_3\pi$, the following relationships are established.

(Formula 5)

$$0 \leq |a_1-a_2| \leq 0.2 \quad (1a)$$

$$0.2 < |a_3-a_1| \quad (1b)$$

$$0.2 < |a_3-a_2| \quad (1c)$$

According to the above configuration, the above relationships are established.

(Formula 6)

$$0 \leq |a_1-a_2| \leq 0.15 \quad (2a)$$

$$0.25 < |a_3-a_1| \quad (2b)$$

$$0.25 < |a_3-a_2| \quad (2c)$$

In particular, it is preferable that the above relationships are established.

Further, in these relationships, m can be an integer which is equal to or larger than 0.

(Formula 7)

$$0.2+2m < |a_3| < 1.8+2m \quad (3)$$

According to the above configuration, it is more preferable that the following relationship is established.

That is, in the third aspect, when the relationship of $0 \leq |a_1-a_2| \leq 0.2$ is established, and preferably, the relationship of $0 \leq |a_1-a_2| \leq 0.15$ is established, the absolute value of the phase difference in the lights having the wavelength $\lambda_1$ which transmit the convex portion and the concave portion and the absolute value of the phase difference in the lights having the wavelength $\lambda_2$ which transmit the convex portion and the concave portion are substantially the same. Further, if the phase difference in the lights having the wavelength $\lambda_3$ is $a_3\pi$, when the values of $|a_3-a_1|$ and $|a_3-a_2|$ are not all within the range, that is, when the relationships of $0.2 < |a_3-a_1|$, $0.2 < |a_3-a_2|$ are established, and preferably the relationships of $0.25 < |a_3-a_1|$, $0.25 < |a_3-a_2|$ are established, the phase difference in the lights having the wavelength $\lambda_3$ which transmit the convex portion and the concave portion is substantially different from the phase difference in the wavelength $\lambda_1$ and the phase difference in the wavelength $\lambda_2$.

With such a configuration, the diffraction may not occur or may occur under a certain ratio with respect to the lights having the wavelength $\lambda_1$ and the wavelength $\lambda_2$, but the diffraction may occur with respect to the lights having the wavelength $\lambda_3$. Alternatively, the diffraction may occur with respect to the lights having the wavelength $\lambda_1$ and the wavelength $\lambda_2$, but the diffraction may not occur or may occur under a certain ratio with respect to the lights having the wavelength $\lambda_3$. Accordingly, even with the configuration of the third aspect, since the design of the diffraction efficiency can be performed in the three wavelength bands, it is possible to enhance the degree of freedom for the wavelength selectivity of the diffraction efficiency.

The diffraction grating of the invention may be mounted on the optical head device having a three wavelength laser light source of a wavelength of 405 nm (HD-DVD or BD), a wavelength of 660 nm (DVD), and a wavelength of 785 nm (CD), for example. In this case, for example, the lights of the wavelength $\lambda_1$ can include lights of a wavelength band of a wavelength 660 nm±10 nm, the lights of the wavelength $\lambda_2$ can include lights of a wavelength band of a wavelength 785 nm±10 nm, and the lights of the wavelength $\lambda_3$ can include lights of a wavelength band of a wavelength 405 nm±10 nm.

Hereinafter, embodiments of the invention will be described. Here, the invention is not limited thereto, a variety of modifications can be performed in a range without departing from the spirit of the invention. For example, in the diffraction grating according to the invention, two or more diffraction gratings may be stacked. In a case where two diffraction gratings are stacked, the diffraction gratings may be respectively formed using two substrates and then be overlapped with each other, or two convex and concave portions may be formed on three substrates.

In the first to sixth embodiments, quartz glass is used as a material which forms the substrate 2 and the convex portion 3 in FIG. 1, and $Ta_2O_5$ is used as a material which forms the concave portion 4, respectively. The refractive index of the quartz glass in the wavelength 405 nm is 1.467, the refractive index thereof in the wavelength 660 nm is 1.456, and the refractive index thereof in the wavelength 785 nm is 1.454. Further, the refractive index of $Ta_2O_5$ in the wavelength 405 nm is 2.273, the refractive index thereof in the wavelength 660 nm is 2.153, and the refractive index thereof in the wavelength 785 nm is 2.137. In FIG. 1, a space 5 from a surface of the concave portion 4 to a surface of the convex portion 3 has a depth of $d_1$, which is filled with air. Accordingly, the refractive indices of the space 5 in wavelengths of 405 nm, 660 nm, and 785 nm are all 1.000. A pitch p of the convex portion 3 is 10 μm. Further, when three wavelengths are 405 nm, 660 nm, and 785 nm, respectively, the refractive indices in the respective materials (mediums) for use are shown in the table 1, which is referred to in the following embodiments as necessary.

TABLE 1

| | wavelength | 405 nm | 660 nm | 785 nm |
|---|---|---|---|---|
| Refractive index | $SiO_2$ | 1.487 | 1.468 | 1.465 |
| | $TiO_2$ | 2.488 | 2.206 | 2.170 |
| | $Ta_2O_5$ | 2.273 | 2.153 | 2.137 |
| | $Nb_2O_5$ | 2.549 | 2.319 | 2.295 |
| | Air | 1.000 | 1.000 | 1.000 |

First Embodiment of Diffraction Grating

In FIG. 1, if the height of the concave portion 4 (hereinafter, the height means the distance from the substrate 2 to the surface of the concave portion 4) is $d_2$, the height of the convex portion 3 (hereinafter, the height means the distance from the substrate 2 to the surface of the convex portion 3) is $(d_1+d_2)$. In a case where the lights of the wavelength λ are incident to the diffraction grating 1, if the refractive index of the convex portion 3 is $n_1$ and the refractive index of the concave portion 4 is $n_2$, the optical path length in the convex portion 3 is $n_1 \times (d_1+d_2)$, and the optical path length in the concave portion 4 is as follows.

$$n_2 \times d_2 + 1 \times d_1 \qquad \text{(Formula 8)}$$

Thus, the optical path length difference L (λ) between the convex portion 3 and the concave portion 4 is as follows.

(Formula 9)

$$L(\lambda) = n_1 \times (d_1+d_2) - (n_2 \times d_2 + 1 \times d_1) \qquad (4)$$

Accordingly, if the optical path length difference between the convex portion 3 and the concave portion 4 in the respective wavelengths from the respective refractive indices of the convex portion 3 and the concave portion 4 in the wavelengths 405 nm, 660 nm, and 785 nm are calculated, the optical path length difference in the wavelength 405 nm is as follows.

(Formula 10)

$$L(405) = 0.467 \times d_1 - 0.803 \times d_2 \qquad (5a)$$

Further, the optical path length difference in the wavelength 660 nm is as follows.

(Formula 11)

$$L(660) = 0.456 \times d_1 - 0.697 \times d_2 \qquad (5b)$$

Further, the optical path length difference in the wavelength 785 nm is as follows.

(Formula 12)

$$L(785) = 0.454 \times d_1 - 0.683 \times d_2 \qquad (5c)$$

The above formulas are established.

In order to set the optical path length difference L for the lights of the wavelength 785 nm to zero, from the following formula (5c), the following relationship may be established.

(Formula 13)

$$(d_1/d_2) = 1.504 \qquad (6a)$$

At this time, from the following formula (5a), the following relationship is established.

$$L(405) = -0.0688 \times d_1 \qquad \text{(Formula 14)}$$

Accordingly, as these values are changed while allowing the ratio between $d_1$ and $d_2$ to satisfy the relationship of the formula (6a), the diffraction efficiency in the wavelength 405 nm can be adjusted. Further, from the formula (5b), the following formula is obtained.

$$L(660) = -0.00731 \times d_1 \qquad \text{(Formula 15)}$$

Thus, if $d_1$ is a sufficiently small value, the optical path length difference in the wavelength 660 nm can be reduced to obtain a high transmittance.

In this way, as the optical path length differences in the wavelength 660 nm and the wavelength 785 nm are set to zero or substantially the same value as zero, and the optical path length difference in the wavelength 405 nm is set to a value which is substantially different from them or the non-integral multiple of 2π, a diffraction grating having a high transmittance in the wavelength of 660 nm and the wavelength of 785 nm and having a predetermined diffraction efficiency in the wavelength of 405 nm can be obtained.

Second Embodiment of Diffraction Grating

In order to set the optical path length difference L to zero with respect to the lights of the wavelength of 405 nm, from the formula (5a) as described in the first embodiment of the diffraction grating, the following relationship may be established.

(Formula 16)

$$d_1/d_2 = 1.726 \qquad (6b)$$

At this time, from the following formula (5c), the following relationship is established.

$$L(785) = 0.0583 \times d_1 \qquad \text{(Formula 17)}$$

Accordingly, as these values are changed while allowing the ratio between $d_1$ and $d_2$ to satisfy the relationship of the formula (6b), the diffraction efficiency in the wavelength 785 nm can be adjusted. Similarly, from the formula (5b), the following formula is obtained.

$$L(660) = 0.0522 \times d_1 \qquad \text{(Formula 18)}$$

Thus, as these values are changed while allowing the ratio between $d_1$ and $d_2$ to satisfy the relationship of the formula (6b), the diffraction efficiency in the wavelength 660 nm can be adjusted.

In this way, as the optical path length difference in the wavelength 405 nm is set to zero or substantially the same value as zero, and the optical path length differences in the wavelength 785 nm and the wavelength 660 nm are set to a value which is substantially different from the above values or the non-integral multiple of 2π, a diffraction grating having a high transmittance in the wavelength of 405 nm and having a predetermined diffraction efficiency in the wavelength of 785 nm and the wavelength of 660 nm can be obtained.

Third Embodiment of Diffraction Grating

A diffraction grating is designed in which the optical path length difference L is the integral multiple of the wavelength with respect to the lights of the wavelength of 405 nm and the lights of the wavelength of 660 nm, and the optical path length difference L is the non-integral multiple of the wavelength with respect to the lights of the wavelength of 785 nm. This diffraction grating corresponds to the diffraction grating according to the first aspect of the invention.

From the formula (5a) and the formula (5b) as described in the first embodiment, when $d_1=5.94$ μm and $d_2=2.94$ μm, the optical path length difference L for the lights of the wavelength of 405 nm and the wavelength of 660 nm becomes the integral multiple of the wavelength. Accordingly, a high transmittance is obtained with respect to these wavelengths. On the other hand, at this time, with respect to the lights of the wavelength of 785 nm, the following formula is obtained from the formula (5c) as described in the first embodiment.

$$L(785)=0.689 \tag{Formula 19}$$

Thus, the optical path length difference L is the non-integral multiple of the wavelength and is diffracted.

Accordingly, according to the configuration of the present embodiment, the diffraction grating having a high transmittance in the wavelength of 405 nm and the wavelength of 660 nm and diffracted in the wavelength of 785 nm can be obtained.

Fourth Embodiment of Diffraction Grating

A diffraction grating is designed in which the optical path length difference L is the non-integral multiple of the wavelength with respect to the lights of the wavelength of 405 nm and the optical path length difference L is the integral multiple of the wavelength with respect to the lights of the wavelength of 660 nm and the lights of the wavelength of 785 nm. This diffraction grating corresponds to the diffraction grating according to the first aspect of the invention.

In FIG. 1, if the height $d_2$ of the concave portion 4 is 0.7 μm, the height $(d_1+d_2)$ of the convex portion 3 is 1.75 μm. The phase difference $\phi$ of the transmitted lights of the convex portion 3 and the concave portion 4 is about $-0.365\pi$ in the wavelength of 405 nm, is about $-0.028\pi$ in the wavelength of 660 nm, and is about $-0.004\pi$ in the wavelength of 785 nm.

In the diffraction grating 1, the diffraction efficiency of the zero-order diffracted lights which travel straight for transmission is approximately calculated by the following formula.

(Formula 20)

$$\eta_0=\cos^2(\phi/2) \tag{7a}$$

The diffraction efficiency of the ±first-order diffracted lights is approximately calculated by the following formula.

(Formula 21)

$$\eta_1=(2/\pi)^2\times\sin^2(\phi/2) \tag{7b}$$

Accordingly, the lights of the wavelength of 405 nm are diffracted in which the diffraction efficiency of the ±first-order diffracted lights becomes a maximum of about 11.9%, but the lights of the wavelength of 660 nm and the wavelength of 785 nm travel straight for transmission in which the diffraction efficiency of the zero-order diffracted lights becomes a maximum of 100%.

Fifth Embodiment of Diffraction Grating

A diffraction grating is designed in which an absolute value of the phase difference in the lights of the wavelength of 660 nm and an absolute value of the phase difference in the lights of the wavelength of 785 nm are substantially the same as each other, and the phase difference in the lights of the wavelength of 405 nm is substantially different from the phase difference in the wavelength of 660 nm and the phase difference in the wavelength of 785 nm. This diffraction grating corresponds to the diffraction grating according to the third aspect of the invention.

In FIG. 1, if the height $d_2$ of the concave portion 4 is 1.17 μm, the height $(d_1+d_2)$ of the convex portion 3 is 3.17 μm. The phase difference $\phi$ of the transmitted lights of the convex portion 3 and the concave portion 4 is about $-0.0445\pi$ in the wavelength of 405 nm, is about $0.292\pi$ in the wavelength of 660 nm, and is about $0.277\pi$ in the wavelength of 785 nm. Accordingly, if $\lambda_1=660$ nm, $\lambda_2=785$ nm, and $\lambda_3=405$ nm, and the phase differences of the lights are respectively $a_1\pi$, $a_1\pi$, and $a_3\pi$, when m is zero in the relationships of the formulas (1a) to (1c) and an inequality expression of the formula (3), $a_3\cong0.277$.

$$0.2<|a_3|<1.8 \tag{Formula 22}$$

Thus, the above relationship is established.

In the diffraction grating 1, the diffraction efficiency of the zero-order diffracted lights which travel straight for transmission and the diffraction efficiency of the ±first-order diffracted lights are calculated in the same way as in the fourth embodiment of the diffraction grating. Accordingly, the lights of the wavelength of 405 nm travel straight for transmission in which the diffraction efficiency of the zero-order diffracted lights becomes a maximum of about 99.5%, but the lights of the wavelength of 660 nm is diffracted in which the diffraction efficiency of the ±first-order diffracted lights becomes a maximum of about 8.0% and the lights of the wavelength of 785 nm is diffracted in which the diffraction efficiency of the ±first-order diffracted lights becomes a maximum of about 7.2%, respectively.

Sixth Embodiment of Diffraction Grating

A diffraction grating is designed in which the optical path length difference L is the integral multiple of the wavelength with respect to the lights of the wavelength of 405 nm and the wavelength of 660 nm and the optical path length difference L is the non-integral multiple of the wavelength with respect to the lights of the wavelength of 785 nm. This diffraction grating corresponds to the diffraction grating according to the first aspect of the invention.

In FIG. 1, if the height $d_2$ of the concave portion 4 is 2.7 μm, the height $(d_1+d_2)$ of the convex portion 3 is 8.2 μm. The phase difference $\phi$ of the transmitted lights of the convex portion 3 and the concave portion 4 is about $1.94\pi$ in the wavelength of 405 nm, is about $1.90\pi$ in the wavelength of 660 nm, and is about $1.66\pi$ in the wavelength of 785 nm. Accordingly, the lights of the wavelength of 405 nm and the wavelength of 660 nm travel straight for transmission in which the phase difference $\phi$ becomes about $2\pi$, but the lights of the wavelength of 785 nm are diffracted in which the diffraction efficiency of the ±first-order diffracted lights becomes a maximum of about 10%.

Seventh Embodiment of Diffraction Grating

In the first to sixth embodiments of the diffraction grating, the material which includes $SiO_2$ as a main component is used for the convex portion, and the single-layer film which includes $Ta_2O_5$ as a main component is used for the concave portion. In this embodiment, quartz glass is used for the convex portion and a material which includes $Nb_2O_5$ as a main component is used for the concave portion.

In FIG. 1, the quartz glass is used as the material which forms the substrate 2 and the convex portion 3. Further, the concave portion 4 is formed of $Nb_2O_5$. The refractive index of the quartz glass in the wavelength of 405 nm is 1.467, the refractive index thereof in the wavelength of 660 nm is 1.456, and the refractive index thereof in the wavelength of 785 nm is 1.454. Further, as shown in the table 1, the refractive index of $Nb_2O_5$ in the wavelength of 405 nm is 2.549, the refractive index thereof in the wavelength of 660 nm is 2.319, and the refractive index thereof in the wavelength of 785 nm is 2.295.

The height $d_2$ of the concave portion 4 is set to 0.339 μm, and the height $(d_1+d_2)$ of the convex portion 3 is set to 0.985

μm. The space 5 from the surface of the concave portion 4 to the surface of the convex portion 3 has the depth of $d_1$, which is filled with air. Accordingly, the refractive indices of the space 5 in the wavelengths of 405 nm, 660 nm, and 785 nm all become 1.000.

The phase difference φ of the transmitted lights of the convex portion 3 and the concave portion 4 in the configuration according to the embodiment of the invention is about −0.323π in the wavelength of 405 nm, is about 0.005π in the wavelength of 660 nm, and is about 0.020π in the wavelength of 785 nm. In the diffraction grating 1, the diffraction efficiency of the zero-order diffracted lights which travel straight for transmission is approximately calculated according to the formula (7a) and the diffraction efficiency of the ±first-order diffracted lights is approximately calculated according to the formula (7b), respectively.

Accordingly, the lights of the wavelength of 405 nm are diffracted in which the diffraction efficiency of the ±first-order diffracted lights becomes a maximum of 9.6%, but the lights of the wavelength of 660 nm and the wavelength of 785 nm travel straight for transmission in which the diffraction efficiency of the zero-order diffracted lights becomes a maximum of 100%, respectively.

Eighth Embodiment of Diffraction Grating

In this embodiment, the quartz glass is used for the convex portion, and the material which includes $TiO_2$ as a main component is used for the concave portion.

In FIG. 1, the quartz glass is used as the material which forms the substrate 2 and the convex portion 3. Further, the concave portion 4 is formed of $TiO_2$. The refractive index of the quartz glass in the wavelength of 405 nm is 1.467, the refractive index thereof in the wavelength of 660 nm is 1.456, and the refractive index thereof in the wavelength of 785 nm is 1.454. Further, as shown in the table 1, the refractive index of $TiO_2$ in the wavelength of 405 nm is 2.488, the refractive index thereof in the wavelength of 660 nm is 2.206, and the refractive index thereof in the wavelength of 785 nm is 2.170.

The height $d_2$ of the concave portion 4 is set to 0.251 μm, and the height $(d_1+d_2)$ of the convex portion 3 is set to 0.659 μm. The space 5 from the surface of the concave portion 4 to the surface of the convex portion 3 has the depth of $d_1$, which is filled with air. Accordingly, the refractive indices of the space 5 in the wavelengths of 405 nm, 660 nm, and 785 nm all become 1.000.

The phase difference φ of the transmitted lights of the convex portion 3 and the concave portion 4 in the configuration according to the present embodiment is about −0.322π in the wavelength of 405 nm, is about −0.005π in the wavelength of 660 nm, and is about 0.016π in the wavelength of 785 nm. In the diffraction grating 1, the diffraction efficiency of the zero-order diffracted lights which travel straight for transmission is approximately calculated according to the formula (7a) and the diffraction efficiency of the ±first-order diffracted lights is approximately calculated according to the formula (7b), respectively.

Accordingly, the lights of the wavelength of 405 nm are diffracted in which the diffraction efficiency of the ±first-order diffracted lights becomes a maximum of 9.5%, but the lights of the wavelength of 660 nm and the wavelength of 785 nm travel straight for transmission in which the diffraction efficiency of the zero-order diffracted lights becomes a maximum of 100%, respectively.

Ninth Embodiment of Diffraction Grating

In the first to eighth embodiments, the quartz glass is used for the convex portion, and the single-layer film which includes $Ta_2O_5$ as a main component, the single-layer film which includes $Nb_2O_5$ as a main component, or the single-layer film which includes $TiO_2$ as a main component is used for the concave portion. On the other hand, in this embodiment, the convex portion is formed of a single-layer film which includes $SiO_2$ as a main component, and the concave portion is formed of a multi-layer film in which a material which includes $SiO_2$ as a main component and a material which includes $Ta_2O_5$ as a main component are stacked.

In FIG. 1, the quartz glass is used as the material which forms the substrate 2 and the convex portion 3. Further, the concave portion 4 is formed of the multi-layer film of $SiO_2$ and $Ta_2O_5$. For example, after a resist film is formed on the quartz glass using the photolithography method, the quartz glass is patterned using the resist film as a mask to thereby form the convex portion 3 having a height of 1.845 μm. Then, a $Ta_2O_5$ film having a thickness of 0.7 μm is formed using the sputtering method, and then, a $SiO_2$ film having a thickness of 0.085 μm is formed by the sputtering method. Then, the resist film is removed by the lift-off method to thereby form the concave portion 4.

The refractive index of the quartz glass in the wavelength of 405 nm is 1.467, the refractive index thereof in the wavelength of 660 nm is 1.456, and the refractive index thereof in the wavelength of 785 nm is 1.454. Further, as shown in the table 1, the refractive index of $SiO_2$ in the wavelength of 405 nm is 1.487, the refractive index thereof in the wavelength of 660 nm is 1.468, and the refractive index thereof in the wavelength of 785 nm is 1.465. Further, as shown in the table 1, the refractive index of $Ta_2O_5$ in the wavelength of 405 nm is 2.273, the refractive index thereof in the wavelength of 660 nm is 2.153, and the refractive index thereof in the wavelength of 785 nm is 2.137.

Since the height $d_2$ of the concave portion 4 is 0.785 μm, and the height $(d_1+d_2)$ of the convex portion 3 is 1.845 μm. The space 5 from the surface of the concave portion 4 to the surface of the convex portion 3 has the depth of $d_1$, which is filled with air. Accordingly, the refractive indices of the space 5 in the wavelengths of 405 nm, 660 nm, and 785 nm all become 1.000.

Here, if the reflectance in a case where a $Ta_2O_5$ film is formed on the quartz glass substrate with a thickness of 0.7 μm and the top thereof is an air layer is calculated by the characteristic matrix method, the reflectance becomes 4.7% in the wavelength of 405 nm, becomes 25.7% in the wavelength of 660 nm, and becomes 9.6% in the wavelength of 785 nm. Accordingly, in a case where the concave portion 4 is formed of the $Ta_2O_5$ film, the diffraction efficiency of the zero-order diffracted lights which is approximated by the formula (7a) is not able to be obtained. On the other hand, if the reflectance in a case where the $Ta_2O_5$ film is formed on the quartz glass substrate with a thickness of 0.7 μm, the $SiO_2$ film is formed with a thickness of 0.085 μm, and the top thereof is an air layer is calculated by the characteristic matrix method, the reflectance becomes 5.9% in the wavelength of 405 nm, becomes 4.7% in the wavelength of 660 nm, and becomes 0% in the wavelength of 785 nm. Accordingly, the amount of lights which transmit the diffraction grating can be increased.

The phase difference φ of the transmitted lights of the convex portion 3 and the concave portion 4 in the configuration according to the present embodiment is about −0.342π in the wavelength of 405 nm, is about −0.014π in the wavelength of 660 nm, and is about 0.008π in the wavelength of 785 nm. In the diffraction grating, the diffraction efficiency of the zero-order diffracted lights which travel straight for transmission is approximately calculated according to the formula (7a) and the diffraction efficiency of the ±first-order diffracted lights is approximately calculated according to the formula (7b), respectively.

Accordingly, the lights of the wavelength of 405 nm are diffracted in which the diffraction efficiency of the ±first-order diffracted lights becomes a maximum of 10.6%, but the lights of the wavelength of 660 nm and the wavelength of 785 nm travel straight for transmission in which the diffraction efficiency of the zero-order diffracted lights becomes a maximum of 100%, respectively.

Tenth Embodiment of Diffraction Grating

In this embodiment, the quartz glass is used for the convex portion, and the concave portion is formed of a multi-layer film in which a material which includes $SiO_2$ as a main component and a material which includes $Ta_2O_5$ as a main component are alternately stacked.

In FIG. 1, the quartz glass is used as the material which forms the substrate 2 and the convex portion 3. Further, the concave portion 4 is formed of a multi-layer film of $SiO_2$ and $Ta_2O_5$. For example, after a resist film is formed on the quartz glass using the photolithography method, the quartz glass is patterned using the resist film as a mask to thereby form the convex portion 3 having a height of 1.8477 μm. Then, a multi-layer film including $SiO_2$ and $Ta_2O_5$ is formed with the thickness of 0.7877 μm to obtain the concave portion 4. The multi-layer film has ten layers, in which the odd layers from the side of the substrate 2 are made of $Ta_2O_5$ films and the even layers are made of $SiO_2$ films. The thicknesses of the respective layers are sequentially 0.385 μm, 0.0095 μm, 0.1294 μm, 0.0034 μm, 0.0146 μm, 0.0299 μm, 0.1526 μm, 0.0058 μm, 0.0185 μm, and 0.0391 μm, from the side of the substrate 2. At this time, the total film thickness of the $Ta_2O_5$ film is 0.7 μm.

Figure 2:
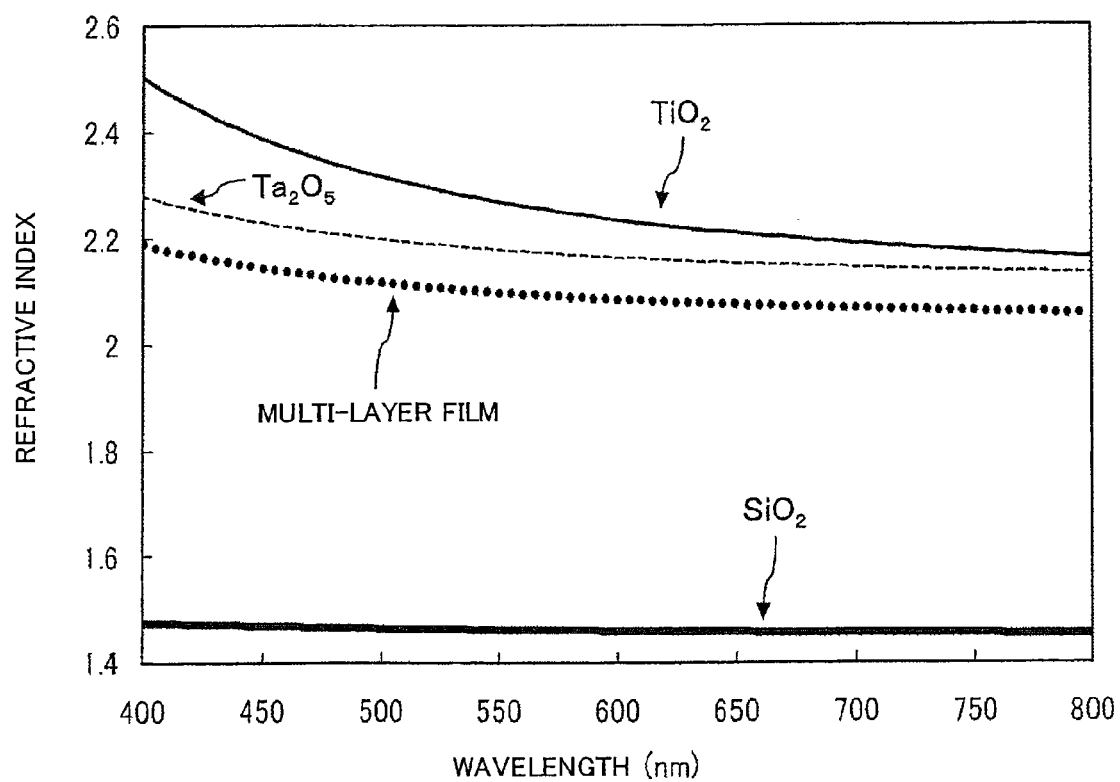
FIG. 2 is a graph illustrating the wavelength dependences of the refractive indices of the main inorganic materials and a multi-layer film.

The refractive index of the quartz glass in the wavelength of 405 nm is 1.467, the refractive index thereof in the wavelength of 660 nm is 1.456, and the refractive index thereof in the wavelength of 785 nm is 1.454. Further, as shown in the table 1, the refractive index of $SiO_2$ in the wavelength of 405 nm is 1.487, the refractive index thereof in the wavelength of 660 nm is 1.468, and the refractive index thereof in the wavelength of 785 nm is 1.465. Further, as shown in the table 1, the refractive index of $Ta_2O_5$ in the wavelength of 405 nm is 2.273, the refractive index thereof in the wavelength of 660 nm is 2.153, and the refractive index thereof in the wavelength of 785 nm is 2.137. As the material of the multi-layer film, in addition to the above-described material, SiON, $ZrO_2$, $Nb_2O_5$, $TiO_2$, $Al_2O_3$, $MgF_2$, or the like can be used. FIG. 2 illustrates wavelength dependence of refractive indices of the multi-layer film made of a main inorganic material and $SiO_2$ and $Ta_2O_5$.

Since the height $d_2$ of the concave portion 4 is 0.7877 μm, the height $(d_1+d_2)$ of the convex portion 3 is 1.8477 μm. The space 5 from the surface of the concave portion 4 to the surface of the convex portion 3 has the depth of $d_1$, which is filled with air. Accordingly, the refractive indices of the space 5 in the wavelengths of 405 nm, 660 nm, and 785 nm become all 1.000.

Here, if the reflectance in a case where the $Ta_2O_5$ film is formed on the quartz glass substrate with a thickness of 0.7 μm and the top thereof is an air layer is calculated by the characteristic matrix method, the reflectance becomes 4.7% in the wavelength of 405 nm, the reflectance becomes 25.7% in the wavelength of 660 nm, and the reflectance becomes 9.6% in the wavelength of 785 nm. Accordingly, in a case where the concave portion 4 is formed of the $Ta_2O_5$ film, it is difficult to obtain the diffraction efficiency of the zero-order diffracted lights which is approximated by the formula (7a). On the other hand, if the reflectance in a case where the multi-layer film is formed on the quartz glass substrate and its top is an air layer is calculated by the characteristic matrix method, the reflectance becomes 1.6% in the wavelength of 405 nm, the reflectance becomes 0.6% in the wavelength of 660 nm, and the reflectance becomes 1.1% in the wavelength of 785 nm. Accordingly, as the concave portion 4 is formed of the multi-layer film, it is possible to increase the amount of lights which transmit the diffraction grating 1.

The phase difference φ of the transmitted lights of the convex portion 3 and the concave portion 4 in the configuration according to the present embodiment is about $-0.342\pi$ in the wavelength of 405 nm, is about $-0.014\pi$ in the wavelength of 660 nm, and is about $0.008\pi$ in the wavelength of 785 nm. In the diffraction grating 1, the diffraction efficiency of the zero-order diffracted lights which travel straight for transmission is approximately calculated according to the formula (7a) and the diffraction efficiency of the ±first-order diffracted lights is approximately calculated according to the formula (7b), respectively.

Accordingly, the lights of the wavelength of 405 nm are diffracted in which the diffraction efficiency of the ±first-order diffracted lights becomes a maximum of 11.9%, but the lights of the wavelength of 660 nm and the wavelength of 785 nm travel straight for transmission in which the diffraction efficiency of the zero-order diffracted lights becomes a maximum of 100%, respectively.

Eleventh Embodiment of Diffraction Grating

This embodiment has a configuration in which the convex portion 3 of $SiO_2$ is formed on the quartz glass substrate and sequentially layers of $Ta_2O_5$ and $SiO_2$ are alternately stacked twice thereon, or a configuration in which the concave portion 4 is formed of $TiO_2$ and $SiO_2$ which are alternately stacked. Four layers except $SiO_2$ on the quartz glass in the convex portion 3 are referred to as an antireflection film (AR film). Further, the average refractive index $n_2$ of the concave portion 4 has the multi-layer film configuration which is larger than the average refractive index $n_1$ of the convex portion 3. However, this embodiment employs a film configuration in which the multi-layer film configuration (ten layers) of the concave portion 4 functions as the antireflection film. Table 2 shows a specific configuration of the convex portion, and table 3 shows a specific configuration of the concave portion.

TABLE 2

| Layer number | Film thickness [nm] | Material |
|---|---|---|
| 1 | 121.2 | $SiO_2$ |
| 2 | 19.6 | $Ta_2O_5$ |
| 3 | 43.7 | $SiO_2$ |
| 4 | 25.3 | $Ta_2O_5$ |
| 5 | 1672.8 | $SiO_2$ |
| Substrate | | Quartz |

TABLE 3

| Layer number | Film thickness [nm] | Material |
|---|---|---|
| 1 | 64.7 | $SiO_2$ |
| 2 | 140.1 | $TiO_2$ |
| 3 | 133.4 | $SiO_2$ |
| 4 | 23.5 | $TiO_2$ |
| 5 | 257.6 | $SiO_2$ |
| 6 | 123.5 | $TiO_2$ |
| 7 | 8.3 | $SiO_2$ |
| 8 | 18.4 | $TiO_2$ |
| 9 | 66.6 | $SiO_2$ |
| 10 | 160.8 | $TiO_2$ |
| substrate | | Quartz |

In the table 2, a layer number "1" is a layer disposed in an interface with air, and a layer number "5" is a layer disposed in an interface with the quartz glass. Further, in the table 3, a layer number "1" is a layer disposed in an interface with air, and a layer number "10" is a layer disposed in an interface with the quartz glass. Further, the thickness $d_1$ in FIG. 1 is 886 nm and the thickness $d_2$ is 997 nm. In addition, at this time, the average refractive indices of the convex portion 3, the concave portion 4 and the space 5 are shown in the following table 4.

TABLE 4

| | wavelength | 405 nm | 660 nm | 785 nm |
|---|---|---|---|---|
| Refractive index | Convex portion | 1.506 | 1.484 | 1.481 |
| | Concave portion | 1.955 | 1.813 | 1.795 |
| | Air | 1.000 | 1.000 | 1.000 |

In this way, the phase difference φ of the transmittances of the convex portion 3 having the AR film and the concave portion 4 including the multi-layer film having the function of the AR film is about 0.000π in the wavelength of 405 nm, is about 0.0307π in the wavelength of 660 nm, and is about 0.289π in the wavelength of 785 nm. In the diffraction grating 1, the diffraction efficiency of the zero-order diffracted lights which travel straight for transmission is approximately calculated according to the formula (7a) and the diffraction efficiency of the ±first-order diffracted lights is approximately calculated according to the formula (7b), respectively.

Accordingly, the lights of the wavelength of 405 nm travel straight for transmission in which the diffraction efficiency of the zero-order diffracted lights becomes a maximum of 100%, but the lights of the wavelength of 660 nm and the wavelength of 785 nm are diffracted in which the diffraction efficiencies of the ±first-order diffracted lights become a maximum of 8.7% and 7.8%, respectively.

(Aberration Correction Element According to the Invention)

FIGS. 3 to 10 are schematic plane diagrams or schematic cross-sectional diagrams illustrating various configurations of the aberration correction element according to the present embodiment. As described later, aberration correction elements 10, 20, 30 and 40 have a convex portion and a concave portion on a transparent substrate such as glass, and the convex portion and the concave portion are arranged according to the type of aberration to be corrected, respectively. Further, in a similar way to the diffraction grating according to the invention, an average refractive index $n_1$ of the convex portion is smaller than an average refractive index $n_2$ of the concave portion. That is, the relationship of $n_1 < n_2$ is established. As an embodiment of the phase correction element, a phase correction element according to a first embodiment and a phase correction element according to a second embodiment will be described hereinafter.

Firstly, in the aberration correction element according to the first embodiment, a phase difference in the lights of a wavelength $\lambda_1$ which transmit the convex portion and the concave portion and a phase difference in the lights of a wavelength $\lambda_2$ which transmit the convex portion and the concave portion are substantially the integral multiple of 2π, and a phase difference in the lights of a wavelength $\lambda_3$ which transmit the convex portion and the concave portion is both substantially the non-integral multiple of 2π. With such a configuration, an aberration component may not be corrected with respect to the lights of the wavelength $\lambda_1$ and the lights of the wavelength $\lambda_2$, but an aberration component may be corrected with respect to the lights of the wavelength $\lambda_3$. The wavelengths $\lambda_1$, $\lambda_2$, and $\lambda_3$ are different from each other. The wavelengths $\lambda_1$, $\lambda_2$, and $\lambda_3$ are different from each other.

Next, in the aberration correction element according to the second embodiment, a phase difference in the lights of a wavelength $\lambda_1$ which transmit the convex portion and the concave portion and a phase difference in the lights of a wavelength $\lambda_2$ which transmit the convex portion and the concave portion are all substantially the non-integral multiple of 2π, and a phase difference in the lights of a wavelength $\lambda_3$ which transmit the convex portion and the concave portion is substantially the integral multiple of 2π. With such a configuration, an aberration component may be corrected with respect to the lights of the wavelength $\lambda_1$ and the lights of the wavelength $\lambda_2$, but an aberration component may not be corrected with respect to the lights of the wavelength $\lambda_3$. The wavelengths $\lambda_1$, $\lambda_2$, and $\lambda_3$ are different from each other.

The aberration component can be selectively corrected for one or two types of lights, among three lights having different wavelengths incident to the aberration correction element in this way. Further, according to one element or a combination of two or more different elements among an astigmatism correction element 10, an astigmatism correction element 20, a coma aberration correction element 30 and a spherical aberration correction element 40, which will be described later, various aberrations can be selectively corrected according to the wavelength of the incident light. For example, in a case of an optical head device which uses an objective lens which is common for lights having three different wavelengths with respect to BDs/DVDs/CDs, the objective lens is designed so that the spherical aberration becomes the minimum with respect to the lights having specific one or two types of wavelengths. On the other hand, a case where the spherical aberration of the lights of other wavelengths is large is considered. At this time, the optical head device can be realized in which the spherical aberration correction can be selectively performed only with respect to the lights of a target wavelength by arranging the spherical aberration correction element 40 in an optical path which is common in three types of lights and the three types of lights are desirably focused on the optical disk, respectively.

Further, the aberration correction element which corrects various aberrations, to be described later, includes the convex portion and the concave portion in at least an effective region to which the lights are incident. Further, without substantially giving a phase difference between the convex portion and the concave portion selectively with respect to the incident lights having a specific one type of wavelength or incident lights having two types of wavelengths, in order to correct aberration only with respect to lights having other wavelengths, the same design as in the above-described "embodiments of the diffraction grating" is used. Thus, a desired phase difference may be given between the convex portion and the concave portion with respect to the lights having the specific one type of wavelength or the lights having two types of wavelengths.

As described above, the aberration correction element according to the first aspect of the invention, the phase difference in the lights having the wavelength $\lambda_1$ which transmit the convex portion and the concave portion and the phase difference in the lights having the wavelength $\lambda_2$ which transmit the convex portion and the concave portion are all substantially the integral multiple of 2π, and the phase difference in the lights having the wavelength $\lambda_3$ which transmit the convex portion and the concave portion is substantially the non-integral multiple of 2π. Further, according to the aberration correction element according to the second aspect of the invention, the phase difference in the lights having the wavelength $\lambda_1$ which transmit the convex portion and the concave portion and the phase difference in the lights having the wavelength $\lambda_2$ which transmit the convex portion and the concave portion are all substantially the non-integral multiple of $2\pi$, and the phase difference in the lights having the wavelength $\lambda_3$ which transmit the convex portion and the concave portion is substantially the integral multiple of $2\pi$. In the former case, it is preferable that the phase difference in the lights having the wavelength $\lambda_1$ and the phase difference in the lights having the wavelength $\lambda_2$ are both zero. On the other hand, in the latter case, it is preferable that the phase difference in the lights having the wavelength $\lambda_3$ is zero. This is because if the phase difference is the integral multiple of $2\pi$, fluctuations due to temperature changes in a laser which is a light source becomes large.

Hereinafter, embodiments of the respective aberration correction elements will be described in detail. Here, the invention is not limited thereto, and a variety of modifications can be performed in a range without departing from the spirit of the invention. For example, in the aberration correction element according to the invention, two or more aberration correction elements may be stacked. In a case where two aberration correction elements are stacked, the aberration correction elements may be respectively formed using two substrates and then be overlapped with each other, or two convex and concave portions may be formed on three substrates.

First Embodiment of Astigmatism Correction Element

Figure 3:
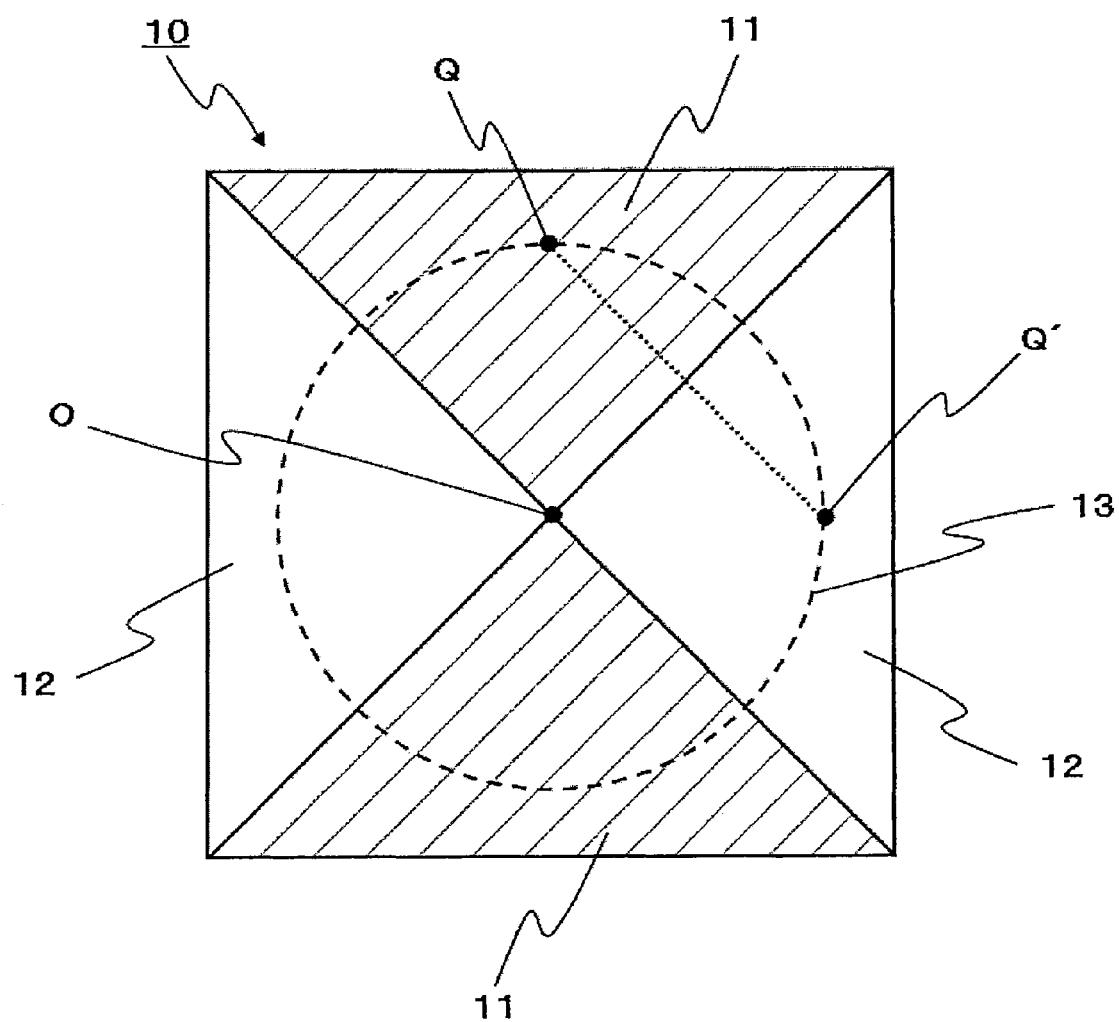
FIG. 3 is a schematic plane diagram illustrating an astigmatism correction element according to the first to four embodiments.

FIG. 3 is a schematic plane diagram illustrating the astigmatism correction element 10, which includes a convex portion 11 and a concave portion 12 in an effective region 13 centering on an optical axis O of lights having a wavelength in which aberration is corrected. Here, the effective region 13 is a region which transmits lights used in an optical system, and for example, in a case of an optical head device which focuses the lights which transmit the astigmatism correction element 10 onto an optical disk using an objective lens, a region corresponding to the lights which are incident to the objective lens becomes the effective region. Further, in a case where all the lights incident to the astigmatism correction element 10 are used, the effective region becomes a region where the light intensity which is approximated in the Gaussian distribution becomes $1/e^2$ or more, when the light intensity of an intersection with the optical axis is 1.

In the astigmatism correction element 10, the convex portion 11 and the concave portion 12 are formed so that two boundary lines of the convex portion 11 and the concave portion 12 which are adjacent are approximately orthogonal to each other and the intersection of these two boundary lines coincides with the optical axis. In FIG. 3, the convex portion 11 and the concave portion 12 show a right triangular region, respectively, but they are not limited thereto. If two convex portions 11 and two concave portions 12 which are arranged by the two boundary lines are arranged in the effective region 13, respectively, an area outside of the effective region 13 may have any shape. Similarly, with respect to the astigmatism correction element 20, the coma aberration correction element 30, and the spherical aberration correction element 40, an area outside of each effective region may have an arbitrary shape or the like.

Figure 4:
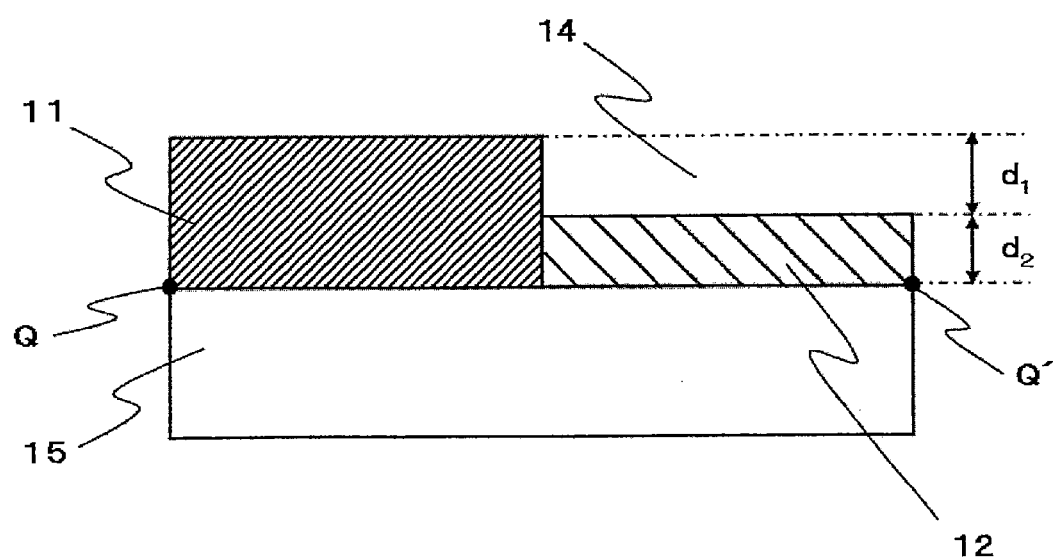
FIG. 4 is a schematic cross-sectional diagram illustrating an astigmatism correction element according to the first to four embodiments.

Further, FIG. 4 is a schematic cross-sectional diagram taken along line Q-Q' which is given to intersect one boundary line in FIG. 3. The astigmatism correction element 10 includes the convex portion 11 having a thickness ($d_1+d_2$) and formed of a medium of which the average refractive index is $n_1$ and the concave portion 12 having a thickness $d_2$ and formed of a medium of which the average refractive index is $n_2$, on a substrate 15. Further, the astigmatism correction element 10 includes a medium having the average refractive index $n_3$, on a space 14 from a surface of the concave portion 12 to a surface of the convex portion 11. Further, lights in the wavelength bands including wavelengths $\lambda_1$, $\lambda_2$, and $\lambda_3$ all satisfy the relationship of $n_2 > n_1 > n_3$.

Here, if the average refractive index of the convex portion 11 is $n_1$ ($\lambda$), the average refractive index of the concave portion 12 is $n_2$ ($\lambda$), and the average refractive index of the space 14 is $n_3$ ($\lambda$), with respect to the lights of the wavelength $\lambda$, an optical path difference L ($\lambda$) between the lights which transmit the convex portion 11 and the lights which transmit the concave portion 12 and the space 14 becomes as follows.

(Formula 23)

$$L(\lambda) = n_1(\lambda) \times (d_1 + d_2) - n_2(\lambda) \times d_2 - n_3(\lambda) \times d_1 \quad (8)$$

This corresponds to the formula (4) according to the first embodiment of the diffraction grating.

In the formula (8), as values of $d_1$ and $d_2$ are set to predetermined values, in a case where the lights having the wavelength $\lambda_3$ are incident to the convex portion 11 and the concave portion 12, the optical path difference L ($\lambda_3$) becomes approximately zero and the astigmatism does not occur, and in a case where the lights having the wavelength $\lambda_1$ and the wavelength $\lambda_2$ are incident thereto, the optical path difference is generated between the convex portion and the concave portion to give the astigmatism, to thereby obtain the astigmatism correction element 10.

Next, specifically, three different wavelengths are set. Further, the average refractive index of the medium of the convex portion 11, the average refractive index of the medium of the concave portion 12, and the average refractive index of the space 14, with respect to the lights of the respective wavelengths, and the thicknesses of the convex portion 11 and the concave portion 12 are set. Firstly, three different wavelengths are set to 405 nm, 660 nm, and 785 nm, respectively. Then, refractive indices of the respective mediums in the respective wavelengths are referred to using the table 1.

In the astigmatism correction element 10 according to the present embodiment, $SiO_2$ is used as the medium of the convex portion 11 and $TiO_2$ is used as the medium of the concave portion 12, on quartz glass as the substrate 15. Further, the medium of the space 14 is air. At this time, if $d_1$ is 942 nm and $d_2$ is 458 nm, the phase differences of the lights of the respective wavelengths calculated by multiplying the optical path length differences of the convex portion 11, the concave portion and the space 14 by $2\pi/\lambda$ and their astigmatisms are shown in the following table 5. The effective region of the lights incident to the astigmatism correction element 10 is 2 mmφ.

TABLE 5

| wavelength | 405 nm | 660 nm | 785 nm |
|---|---|---|---|
| $2\pi L (\lambda)/\lambda$ | $0.000 \pi$ | $0.312 \pi$ | $0.293 \pi$ |
| Astigmatism ($\lambda$rms) | 0.000 | 0.061 | 0.057 |

In this way, the astigmatism correction element 10 is obtained in which the astigmatism does not occur with respect to the lights having the wavelength 405 nm and the astigmatism occurs with respect to the lights having the wavelength 660 nm and the wavelength 785 nm. This embodiment is based on the second embodiment in which the astigmatism does not occur with respect to the lights of one type of wavelength, but the astigmatism occurs with respect to the lights of the two other types of wavelengths, among the lights of the three different wavelengths.

Second Embodiment of Astigmatism Correction Element

The present embodiment is based on the first embodiment in which the astigmatism does not occur with respect to the lights of two types of wavelengths, but the astigmatism occurs with respect to the lights of the one other type of wavelength, among the lights of the three different wavelengths, in the astigmatism correction element 10. The astigmatism correction element 10 uses the same combination of mediums as in the first embodiment of the astigmatism correction element. That is, $SiO_2$ is used as the medium of the convex portion 11 and $TiO_2$ is used as the medium of the concave portion 12, on the quartz glass. At this time, when $d_1$ is 426 nm and $d_2$ is 270 nm, the phase differences of the lights of the respective wavelengths between the convex portion 11, the concave portion 12, and the space 14 and their astigmatisms are shown in the following table 6. The effective region of the lights incident to the astigmatism correction element 10 is 2 mm$\phi$.

TABLE 6

| wavelength | 405 nm | 660 nm | 785 nm |
|---|---|---|---|
| $2\pi L (\lambda)/\lambda$ | $-0.314 \pi$ | $0.000 \pi$ | $0.019 \pi$ |
| Astigmatism ($\lambda$rms) | 0.061 | 0.000 | 0.004 |

In this way, the astigmatism correction element 10 is obtained in which the astigmatism hardly occurs with respect to the lights having the wavelength 660 nm and the wavelength 785 nm, and the astigmatism occurs with respect to the lights having the wavelength 405 nm.

Third Embodiment of Astigmatism Correction Element

The present embodiment is based on the second embodiment in which the astigmatism does not occur with respect to the lights of one type of wavelength, but the astigmatism occurs with respect to the lights of the two other types of wavelengths, among the lights of the three different wavelengths, in the astigmatism correction element 10. $SiO_2$ is used as the medium of the convex portion 11 and $Nb_2O_5$ is used as the medium of the concave portion 12, on the quartz glass. At this time, when $d_1$ is 1342 nm and $d_2$ is 607 nm, the phase differences of the lights of the respective wavelengths between the convex portion 11, the concave portion 12 and the space 14 and their astigmatisms are shown in the following table 7. The effective region of the lights incident to the astigmatism correction element 10 is 2 mm$\phi$.

TABLE 7

| wavelength | 405 nm | 660 nm | 785 nm |
|---|---|---|---|
| $2\pi L (\lambda)/\lambda$ | $0.000 \pi$ | $0.312 \pi$ | $0.285 \pi$ |
| Astigmatism ($\lambda$rms) | 0.000 | 0.061 | 0.056 |

In this way, the astigmatism correction element 10 is obtained in which the astigmatism does not occur with respect to the lights having the wavelength 405 nm and the astigmatism occurs with respect to the lights having the wavelength 660 nm and the wavelength 785 nm.

Fourth Embodiment of Astigmatism Correction Element

The present embodiment is based on the second embodiment in which the astigmatism does not occur with respect to the lights of one type of wavelength, but the astigmatism occurs with respect to the lights of the two other types of wavelengths, among the lights of the three different wavelengths, in the astigmatism correction element 10. This embodiment has a configuration in which the convex portion 11 of $SiO_2$ is formed on the quartz glass substrate and sequentially layers of $Ta_2O_5$ and $SiO_2$ are alternately stacked twice thereon, or a configuration in which the concave portion 12 is formed of $TiO_2$ and $SiO_2$ which are alternately stacked. Four layers except $SiO_2$ on the quartz glass in the convex portion 11 are referred to as an antireflection film (AR film). Further, the average refractive index $n_2$ of the concave portion 12 has the multi-layer film configuration which is larger than the average refractive index $n_1$ of the convex portion 11. However, this embodiment employs a film configuration in which the multi-layer film configuration (ten layers) of the concave portion 12 also functions as the antireflection film. Table 8 shows a specific configuration of the convex portion, and table 9 shows a specific configuration of the concave portion.

TABLE 8

| Layer number | Film thickness [nm] | Material |
|---|---|---|
| 1 | 121.2 | $SiO_2$ |
| 2 | 19.6 | $Ta_2O_5$ |
| 3 | 43.7 | $SiO_2$ |
| 4 | 25.3 | $Ta_2O_5$ |
| 5 | 1672.8 | $SiO_2$ |
|  | Substrate | Quartz |

TABLE 9

| Layer number | Film thickness [nm] | Material |
|---|---|---|
| 1 | 64.7 | $SiO_2$ |
| 2 | 140.1 | $TiO_2$ |
| 3 | 133.4 | $SiO_2$ |
| 4 | 23.5 | $TiO_2$ |
| 5 | 257.6 | $SiO_2$ |
| 6 | 123.5 | $TiO_2$ |
| 7 | 8.3 | $SiO_2$ |
| 8 | 18.4 | $TiO_2$ |
| 9 | 66.6 | $SiO_2$ |
| 10 | 160.8 | $TiO_2$ |
|  | substrate | Quartz |

In the table 8, a layer number "1" is a layer disposed in an interface with air, and a layer number "5" is a layer disposed in an interface with the quartz glass. Further, in the table 9, a layer number "1" is a layer disposed in an interface with air, and a layer number "10" is a layer disposed in an interface with the quartz glass. Further, the thickness $d_1$ in FIG. 4 is 886 nm and the thickness $d_2$ is 997 nm. In addition, at this time, the average refractive indices of the convex portion 11, the concave portion 12 and the space 14 are as shown in table 10.

TABLE 10

|  | wavelength | 405 nm | 660 nm | 785 nm |
|---|---|---|---|---|
| Refractive Index | Convex portion | 1.506 | 1.484 | 1.481 |
|  | Concave portion | 1.955 | 1.813 | 1.795 |
|  | Air | 1.000 | 1.000 | 1.000 |

Figure 11:
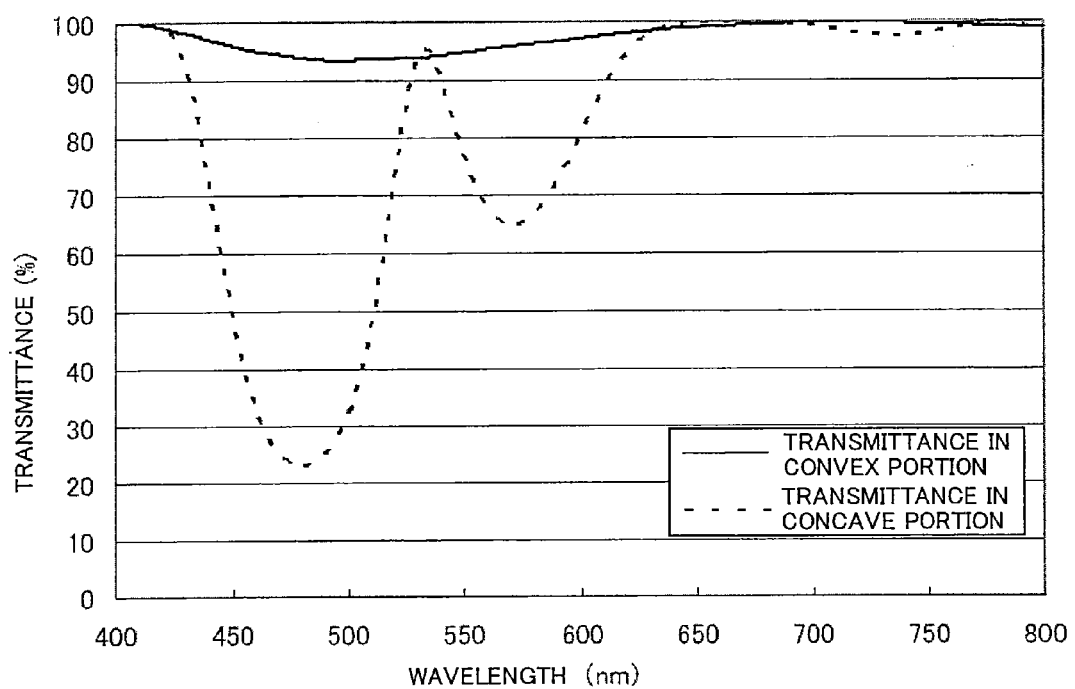
FIG. 11 is a graph illustrating transmittance of a convex portion and a concave portion of an astigmatism correction element according to the fourth embodiment.

In this way, the wavelength dependency of the refractive indices of the convex portion 11 having the AR film and the concave portion 12 including the multi-layer film having the function of the AR film is shown in FIG. 11, and it is possible to reduce the loss of the transmittance due to the interface reflection, in the respective wavelengths of 405 nm, 660 nm and 785 nm. Further, the phase differences of the lights of the respective wavelengths between the convex portion 11, the concave portion 12 and the space 14 and their astigmatisms are as shown in the following table 11.

TABLE 11

| wavelength | 405 nm | 660 nm | 785 nm |
|---|---|---|---|
| $2\pi L (\lambda)/\lambda$ | $0.000 \pi$ | $0.306 \pi$ | $0.289 \pi$ |
| Astigmatism ($\lambda$rms) | 0.000 | 0.059 | 0.056 |

In this way, the astigmatism correction element 10 is obtained in which the astigmatism does not occur with respect to the lights having the wavelength 405 nm and the astigmatism occurs with respect to the lights having the wavelength 660 nm and the wavelength 785 nm to thereby realize higher transmittance.

Fifth Embodiment of Astigmatism Correction Element

Figure 5:
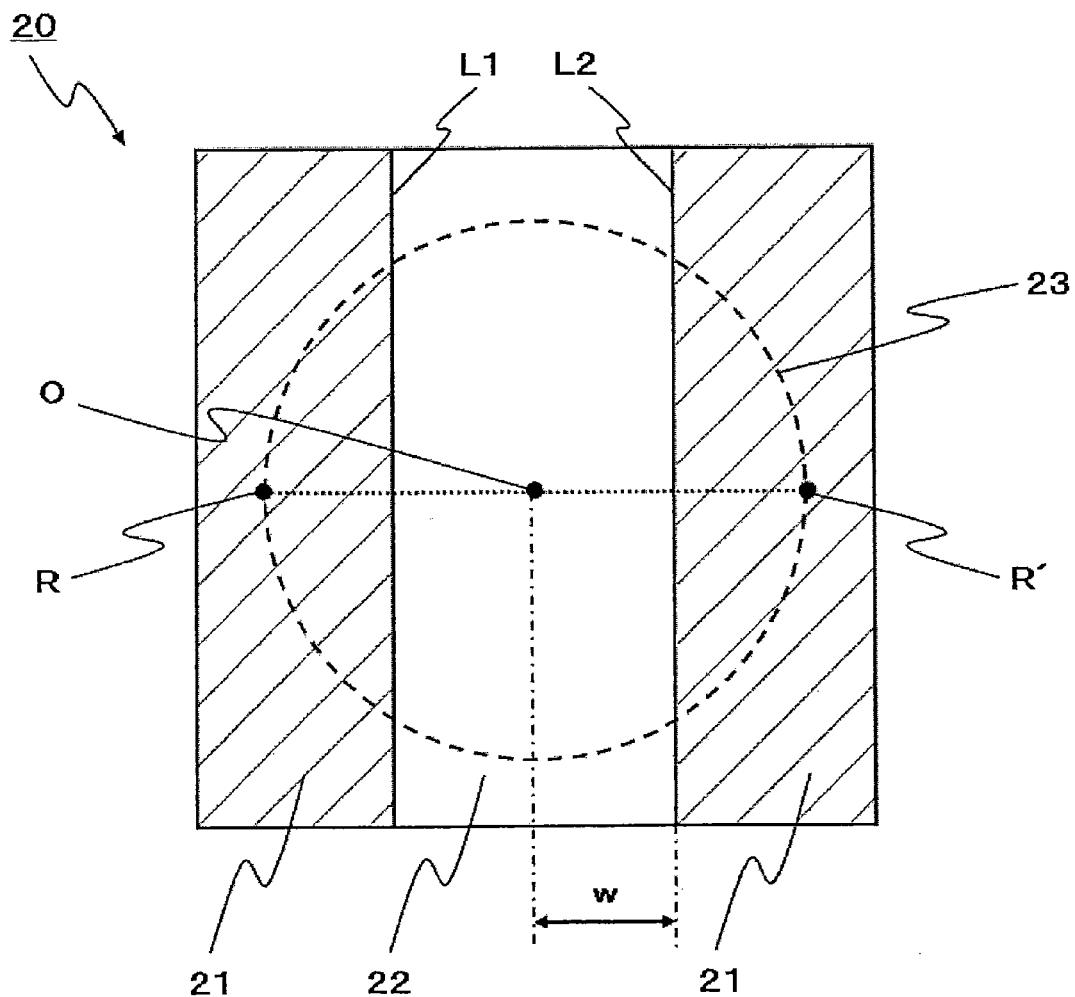
FIG. 5 is a schematic plane diagram illustrating an astigmatism correction element according to the fifth embodiment.

The present embodiment corresponds to an astigmatism correction element having a plane configuration which is different from the first to fourth embodiments of the astigmatism correction element. FIG. 5 is a schematic plane diagram of the astigmatism correction element 20 according to the present embodiment, which includes a convex portion 21 and a concave portion 22 in an effective region 23 centering on an optical axis O of the lights having a wavelength in which aberration is corrected. The astigmatism correction element 20 has a configuration in which the concave portion 22 including an optical axis is disposed inside two boundary lines L1 and L2 which are approximately parallel to each other and two convex portions 21 are respectively disposed outside the concave portion 22.

Figure 6:
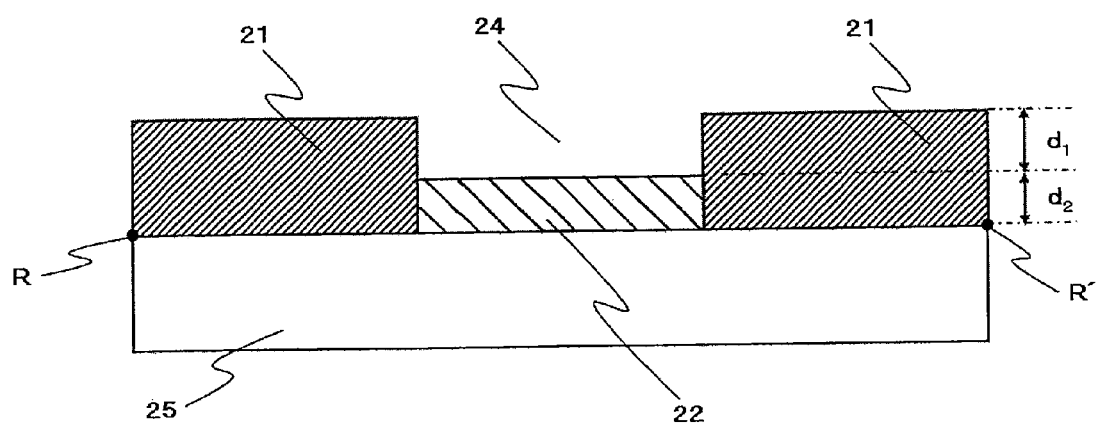
FIG. 6 is a schematic cross-sectional diagram illustrating an astigmatism correction element according to the fifth embodiment.

Further, the optical axis O is positioned on a line which bisects a gap generated by the boundary lines L1 and L2, the (shortest) distance from the optical axis O to the boundary line L1 and the (shortest) distance from the optical axis O to the boundary line L2 are all distances w. FIG. 6 is a schematic cross-sectional diagram taken along line R-R' which includes the optical axis O and is given to intersect the boundary line. L1 and the boundary line L2. The astigmatism correction element 20 includes the convex portion 21 having a thickness $(d_1+d_2)$ and formed of a medium of which the average refractive index is $n_1$ and the concave portion 22 having a thickness $d_2$ and formed of a medium of which the average refractive index is $n_2$, on a substrate 25. Further, the astigmatism correction element 20 includes a medium of which the average refractive index is $n_3$, on a space 24 from a surface of the concave portion 22 to a surface of the convex portion 21. Further, lights in the wavelength bands including wavelengths $\lambda_1$, $\lambda_2$, and $\lambda_3$ all satisfy the relationship of $n_2 > n_1 > n_3$.

The optical path length L ($\lambda$) in each wavelength can be obtained by using the above-described formula (8). In the formula (8), as values of $d_1$ and $d_2$ are set to predetermined values, the astigmatism correction element 20 having wavelength selectivity, which are based on the above-described first embodiment or second embodiment, can be realized. For example, in a case where the lights having the wavelength $\lambda_1$ are incident to the convex portion 21 and the concave portion 22, the optical path difference L ($\lambda_1$) and the optical path difference L ($\lambda_2$) become approximately zero and the astigmatism does not occur, and in a case where the lights having the wavelength $\lambda_3$ are incident thereto, the optical path difference is generated between the convex portion and the concave portion to give the astigmatism, to thereby obtain the astigmatism correction element 20.

Next, specifically, three different wavelengths are set to 405 nm, 660 nm, and 785 nm, respectively. Then, the average refractive index of the medium of the convex portion 21, the average refractive index of the medium of the concave portion 22 and the average refractive index of the space 24, with respect to the lights of the respective wavelengths, and the thicknesses of the convex portion 21 and the concave portion 22 are set.

In the astigmatism correction element 20 according to the present embodiment, $SiO_2$ is used as the medium of the convex portion 21 and $TiO_2$ is used as the medium of the concave portion 22, on quartz glass as the substrate 25. Further, the medium of the space 24 is air. At this time, if $d_1$ is 942 nm and $d_2$ is 458 nm, the phase differences of the lights of the respective wavelengths calculated by multiplying the optical path length differences of the convex portion 21, the concave portion 22 and the space 24 by $2\pi/\lambda$ and their astigmatisms are shown in the following table 12. The effective region of the lights incident to the astigmatism correction element 20 is a circular region of 2 mm$\phi$, and the distance w in FIG. 5 is 0.6 mm.

TABLE 12

| wavelength | 405 nm | 660 nm | 785 nm |
|---|---|---|---|
| $2\pi L (\lambda)/\lambda$ | $0.000 \pi$ | $0.312 \pi$ | $0.293 \pi$ |
| Astigmatism ($\lambda$rms) | 0.000 | 0.050 | 0.047 |

In this way, the astigmatism correction element 20 is obtained in which the astigmatism does not occur with respect to the lights having the wavelength 405 nm and the astigmatism occurs with respect to the lights having the wavelength 660 nm and the wavelength 785 nm. The present embodiment is based on the second embodiment in which the astigmatism does not occur with respect to the lights of one type of wavelength, but the astigmatism occurs with respect to the lights of the two other types of wavelengths, among the lights of the three different wavelengths. Further, the material which forms the convex portion 21 and the material which forms the concave portion 22 are not limited to the above-described materials. The present embodiment may be based on the first embodiment in which the astigmatism does not occur with respect to the lights of two types of wavelengths, but the astigmatism occurs with respect to the lights of the one other type of wavelength, among the lights of the three different wavelengths. Further, the convex portion 21 may have a configuration which includes an AR film, and the concave portion 22 may have a configuration of the multi-layer film. Further, the position of the convex portion 21 and the position of the concave portion 22 may be interchanged, that is, the convex portion may be arranged on the position of the optical axis O.

Embodiment of Coma Aberration Correction Element

Figure 7:
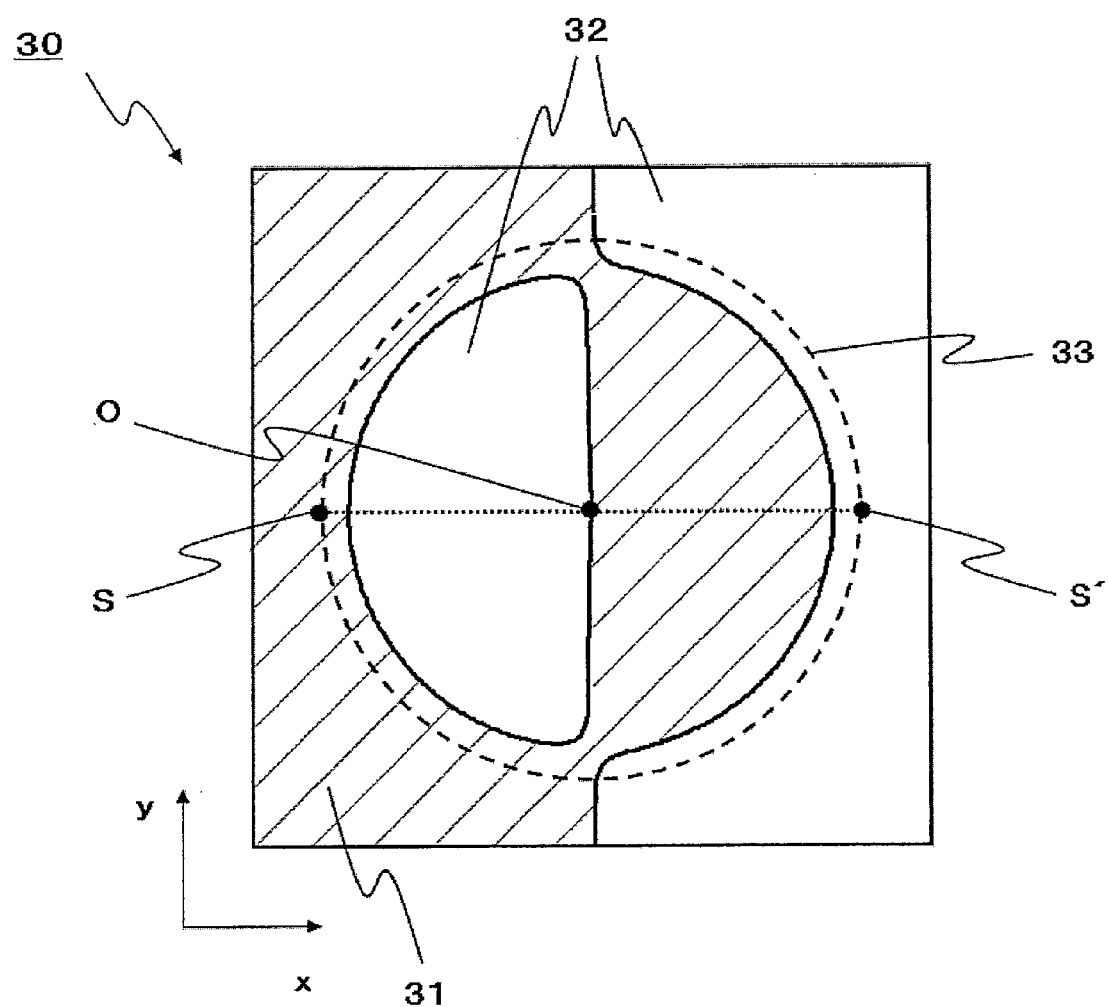
FIG. 7 is a schematic plane diagram illustrating a coma aberration correction element according to an embodiment.

The present embodiment is a coma aberration correction element having a configuration in which coma aberration is corrected. FIG. 7 is a schematic plane diagram of the coma aberration correction element 30 according to the present embodiment, which includes a convex portion 31 and a concave portion 32 in an effective region 33 centering on an optical axis O of the lights having a wavelength in which aberration is corrected. The coma aberration correction element 30 includes an island-shaped concave portion 32 in the effective region 33 in a planar surface orthogonal to the optical axis. Further, when the x direction including the optical axis O in FIG. 7 is a symmetrical axis, the convex portions 31 and the concave portions 32 are overlapped with each other to form a line symmetry so that the region where the concave portion 32 is formed is bisected, and when the y direction including the optical axis O which is orthogonal to the x direction is a symmetrical axis, the convex portion 31 and the concave portion 32 are overlapped with each other.

Specifically, when an original point (x, y)=(0, 0) is the optical axis O in an x-y planar surface in FIG. 7, the effective region 33 has a circular region of a radius r centering around the optical axis O. When X is x/r and Y is y/r in the x-y coordinate system, a region of the concave portion 32 satisfies a predetermined value ϕ or lower, in the following relationship.

(Formula 24)

$$f(X,Y) = a/2 \times (3X^2 + 3Y^2 - 2X) \quad (9)$$

Here, "a" is an arbitrary integer which determines the predetermined value ϕ.

Figure 8:
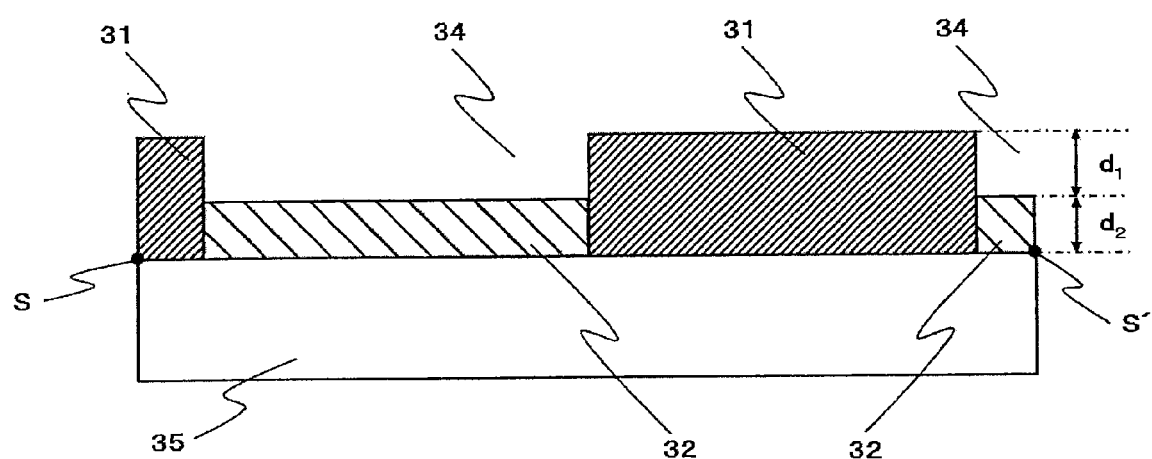
FIG. 8 is a schematic cross-sectional diagram illustrating a coma aberration correction element according to an embodiment.

FIG. 8 is a schematic cross-sectional diagram illustrating line S-S' which is given to intersect a boundary line between the convex portion 31 and the concave portion 32 in the x direction including the optical axis O. The coma aberration correction element 30 includes the convex portion 31 having a thickness $(d_1 + d_2)$ and formed of a medium of which the average refractive index is $n_1$ and the concave portion 32 having a thickness $d_2$ and formed of a medium of which the average refractive index is $n_2$, on a substrate 35. Further, the astigmatism correction element 30 includes a medium of which the average refractive index is $n_3$, on a space 34 from a surface of the concave portion 32 to a surface of the convex portion 31. Further, lights in the wavelength bands including wavelengths $\lambda_1$, $\lambda_2$, and $\lambda_3$ all satisfy the relationship of $n_2 > n_1 > n_3$.

The optical path length L (λ) in each wavelength can be obtained by using the above-described formula (8). In the formula (8), as values of $d_1$ and $d_2$ are set to predetermined values, the coma aberration correction element 30 having wavelength selectivity, which based on the above-described first embodiment or second embodiment, can be realized. For example, in a case where the lights having the wavelength $\lambda_1$ are incident to the convex portion 31 and the concave portion 32, the optical path difference L ($\lambda_1$) and the optical path difference L ($\lambda_2$) become approximately zero and the coma aberration does not occur, and in a case where the lights having the wavelength $\lambda_3$ is incident thereto, the optical path difference is generated between the convex portion and the concave portion to give the coma aberration, to thereby obtain the coma aberration correction element 30.

Next, specifically, three different wavelengths are set to 405 nm, 660 nm, and 785 nm, respectively. Then, the average refractive index of the medium of the convex portion 31, the average refractive index of the medium of the concave portion 32 and the average refractive index of the space 34, with respect to the lights of the respective wavelengths, and thicknesses of the convex portion 31 and the concave portion 32 are set.

In the coma aberration correction element 30 according to the present embodiment, $SiO_2$ is used as the medium of the convex portion 31 and $TiO_2$ is used as the medium of the concave portion 32, on quartz glass as the substrate 35. Further, the medium of the space 34 is air. At this time, the effective region of the lights incident to the coma aberration correction element 30 is a circular region of 2 mmϕ, in which "a" is 0.015 and the predetermined value ϕ is $6.72 \times 10^{-5}$ in the formula (9). At this time, if $d_1$ is 942 nm and $d_2$ is 458 nm, the phase differences of the lights of the respective wavelengths calculated by multiplying the optical path length differences of the convex portion 31, the concave portion 32 and the space 34 by 2π/λ and their coma aberrations are shown in the following table 13.

TABLE 13

| wavelength | 405 nm | 660 nm | 785 nm |
|---|---|---|---|
| 2πL (λ)/λ | 0.000 π | 0.312 π | 0.293 π |
| coma aberration (λrms) | 0.000 | 0.063 | 0.059 |

In this way, the coma aberration correction element 30 is obtained in which the coma aberration does not occur with respect to the lights having the wavelength 405 nm and the coma aberration occurs with respect to the lights having the wavelength 660 nm and the wavelength 785 nm. The present embodiment is based on the second embodiment in which the coma aberration does not occur with respect to the lights of one type of wavelength, but the coma aberration occurs with respect to the lights of the two other types of wavelengths, among the lights of the three different wavelengths. Further, the material which forms the convex portion 31 and the material which forms the concave portion 32, are not limited to the above-described materials. The present embodiment may be based on the first embodiment in which the coma aberration does not occur with respect to the lights of two types of wavelengths, but the coma aberration occurs with respect to the lights of the one other type of wavelength, among the lights of the three different wavelengths. Further, the convex portion 31 may have a configuration which includes the AR film, and the concave portion 32 may have a configuration of the multi-layer film. Further, the position of the convex portion 31 and the position of the concave portion 32 may be interchanged.

Embodiment of Spherical Aberration Correction Element

Figure 9:
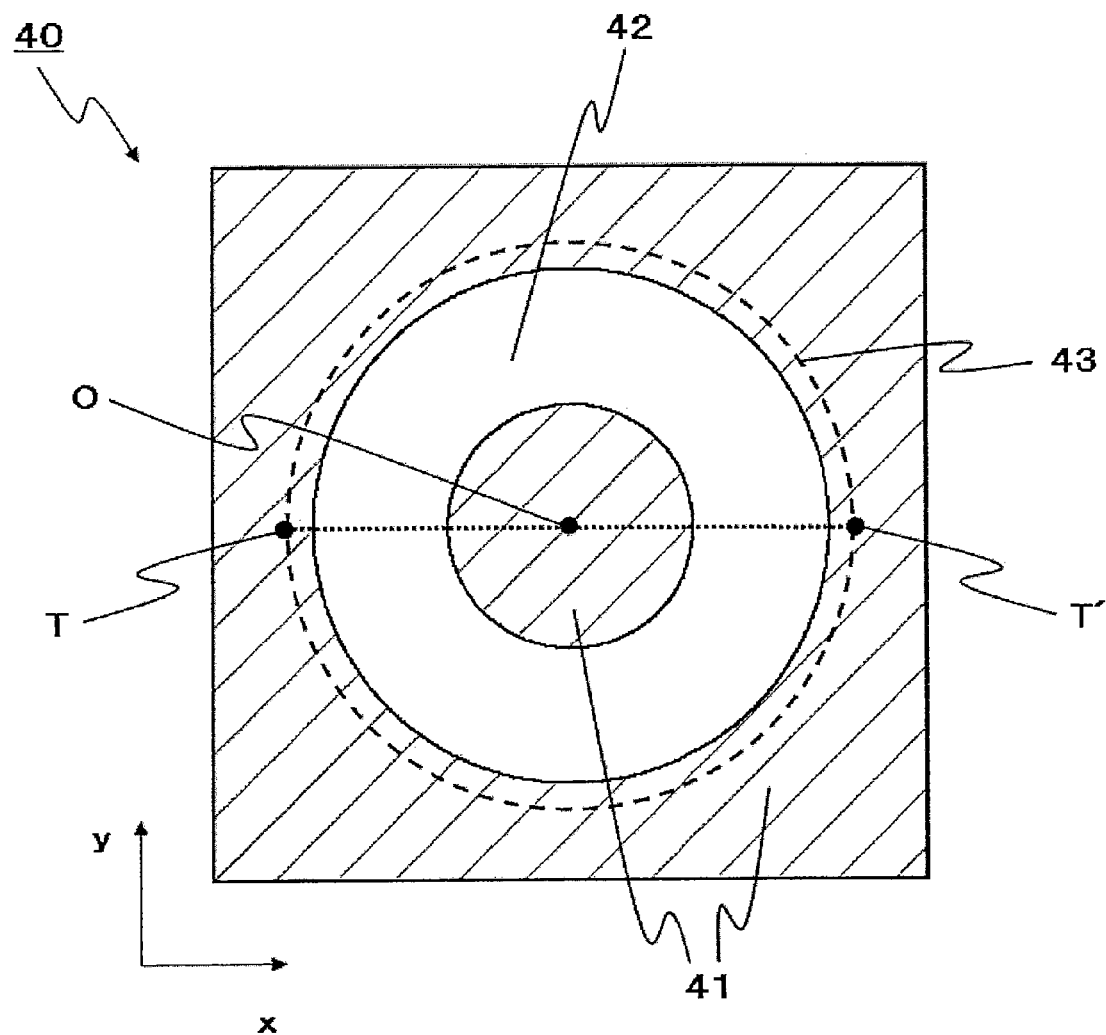
FIG. 9 is a schematic plane diagram illustrating a spherical aberration correction element according to an embodiment.

The present embodiment is a spherical aberration correction element having a configuration in which the spherical aberration is corrected. FIG. 9 is a schematic plane diagram of the spherical aberration correction element 40 according to the present embodiment, which includes a convex portion 41 and a concave portion 42 in an effective region 43 centering on an optical axis O of the lights having a wavelength in which aberration is corrected. The spherical aberration correction element 40 includes the convex portion 41 which becomes a circular region centering around the optical axis O, the concave portion 42 which surrounds the convex portion 41 which becomes the circular region and has an annular shape, and the convex portion 41 which surrounds the concave portion and has the annular shape. That is, the spherical aberration correction element 40 has the circular region including the optical axis O and the plurality of annular shape areas, and the convex portion 41 and the concave portion 42 are alternately arranged in a direction away from the optical axis.

Specifically, when an original point (x, y)=(0, 0) is the optical axis O in an x-y plane surface in FIG. 9, the effective region 43 has a circular region of a radius r centering around the optical axis O. When X is x/r and Y is y/r in an x-y coordinate system, a region of the convex portion 41 satisfies a predetermined value ψ or lower, in the following function.

(Formula 25)

$$f(X,Y) = b/6 \times [6(X^2+Y^2)^2 - 6(X^2+Y^2)] \quad (10)$$

Here, "b" is an arbitrary integer which determines the predetermined value ψ.

Figure 10:
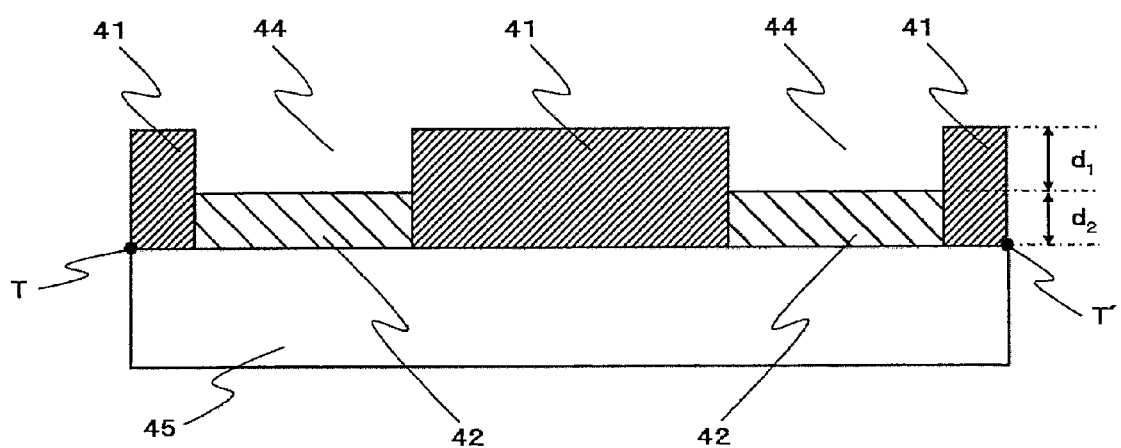
FIG. 10 is a schematic cross-sectional diagram illustrating a spherical aberration correction element according to an embodiment.

FIG. 10 is a schematic cross-sectional diagram illustrating line T-T' which is given to intersect a boundary line between the convex portion 41 and the concave portion 42 in the X direction including the optical axis O. The spherical aberration correction element 40 includes the convex portion 41 having a thickness ($d_1+d_2$) and formed of a medium of which the average refractive index is $n_1$ and the concave portion 42 having a thickness $d_2$ and formed of a medium of which the average refractive index is $n_2$, on a substrate 45. Further, the spherical aberration correction element 40 includes a medium of which the average refractive index is $n_3$, on a space 44 from a surface of the concave portion 42 to a surface of the convex portion 41. Further, lights in the wavelength bands including wavelengths $\lambda_1$, $\lambda_2$, and $\lambda_3$ all satisfy the relationship of $n_2 > n_1 > n_3$.

The optical path length L ($\lambda$) in each wavelength can be obtained by using the above-described formula (8). In the formula (8), as values of $d_1$ and $d_2$ are set to predetermined values, the spherical aberration correction element 40 having wavelength selectivity, which is based on the above-described first embodiment or second embodiment, can be realized. For example, in a case where the lights having the wavelength $\lambda_1$ are incident to the convex portion 41 and the concave portion 42, the optical path difference L ($\lambda_1$) and the optical path difference L ($\lambda_2$) become approximately zero and the spherical aberration does not occur, and in a case where the lights having the wavelength $\lambda_3$ are incident thereto, the optical path difference is generated between the convex portion and the concave portion to give the spherical aberration, to thereby obtain the spherical aberration correction element 40.

Next, specifically, three different wavelengths are set to 405 nm, 660 nm, and 785 nm, respectively. Then, the average refractive index of the medium of the convex portion 41, the average refractive index of the medium of the concave portion 42 and the average refractive index of the space 44, with respect to the lights of the respective wavelengths, and thicknesses of the convex portion 41 and the concave portion 42 are set.

In the spherical aberration correction element 40 according to the present embodiment, $SiO_2$ is used as the medium of the convex portion 41 and $TiO_2$ is used as the medium of the concave portion 42, on quartz glass as the substrate 45. Further, the medium of the space 44 is air. Further, the effective region of the lights incident to the spherical aberration correction element 40 is a circular region of 2 mm$\phi$, in which $b = 1 \times 10^{-3}$ and the predetermined value $\psi$ is $1.5 \times 10^{-4}$ in the formula (10). At this time, if $d_1$ is 942 nm and $d_2$ is 458 nm, the phase differences of the lights of the respective wavelengths calculated by multiplying the optical path length differences of the convex portion 41, the concave portion 42 and the space 44 by $2\pi/\lambda$ and their spherical aberrations are shown in the following table 14.

TABLE 14

| wavelength | 405 nm | 660 nm | 785 nm |
|---|---|---|---|
| $2\pi L (\lambda)/\lambda$ | $0.000 \pi$ | $0.312 \pi$ | $0.293 \pi$ |
| spherical aberration ($\lambda$rms) | 0.000 | 0.063 | 0.059 |

In this way, the spherical aberration correction element 40 is obtained in which the spherical aberration does not occur with respect to the lights having the wavelength 405 nm and the spherical aberration occurs with respect to the lights having the wavelength 660 nm and the wavelength 785 nm. The present embodiment is based on the second embodiment in which the spherical aberration does not occur with respect to the lights of one type of wavelength, but the spherical aberration occurs with respect to the lights of the two other types of wavelengths, among the lights of the three different wavelengths. Further, the material which forms the convex portion 41 and the material which forms the concave portion 42, are not limited to the above-described materials. The present embodiment may be based on the first embodiment in which the spherical aberration does not occur with respect to the lights of two types of wavelengths, but the spherical aberration occurs with respect to the lights of the one other type of wavelength, among the lights of the three different wavelengths. Further, the convex portion 41 may have a configuration which includes the AR film and the concave portion 42 may have a configuration of the multi-layer film. Further, the position of the convex portion 41 and the position of the concave portion 42 may be interchanged.

First Embodiment of Optical Head Device

Figure 12:
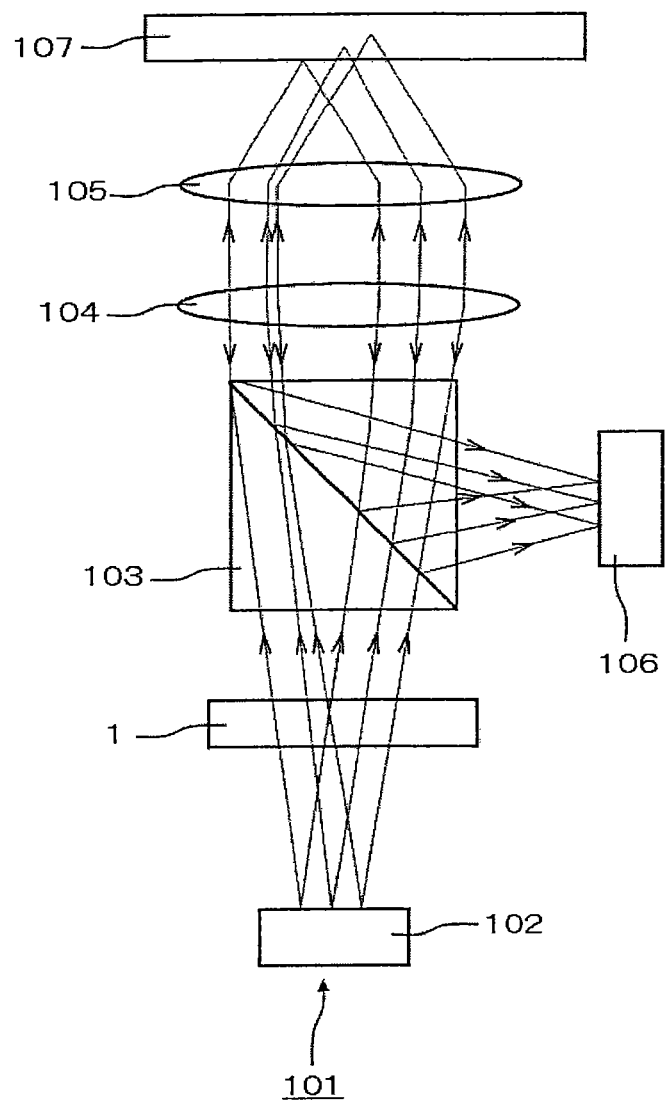
FIG. 12 is a diagram illustrating a configuration of an optical head device according to the first embodiment.

FIG. 12 is a diagram illustrating a configuration of an optical head device according to the present embodiment. The optical head device can be applied to an optical recording medium corresponding to different wavelengths, that is, any one of HD-DVDs, BDs, DVDs or CDs.

An optical head device 101 includes a light source 102 which emits laser lights of three wavelengths of 405 nm, 660 nm and 785 nm, a beam splitter 103, a collimator lens 104, an objective lens 105, and a detector 106. A diffraction grating 1 according to the invention is arranged in an optical path between the light source 102 and the collimator lens 104. In this embodiment, a diffraction grating according to the first embodiment is used as the diffraction grating 1. Thus, three beams for tracking HD-DVDs or BDs are obtained.

The lights emitted from the light source 102 transmit through the diffraction grating 1, the beam splitter 103, the collimator lens 104, and the objective lens 105, and then reach an information recording surface of an optical disk 107 which is an optical recording surface. Then, the lights are reflected from the information recording medium of the optical disk 107 to follow a return path in the order of the objective lens 105 and the collimator lens 104, opposite to the forward path. Thereafter, when the lights pass through the beam splitter 103, their travel direction is bent at 90 degrees to reach the detector 106. The optical disk 107 is an HD-DVD, a BD, a DVD or a CD.

The light source 102 is a three-wavelength semiconductor laser which emits laser lights of the three wavelength bands having the wavelength 405 nm for HD-DVDs or BDs, the wavelength 660 nm for DVDs, and the wavelength 785 nm for CDs. The invention is not limited thereto, and for example, the optical head device may be configured by using two light sources which include a two-wavelength semiconductor laser which outputs laser lights of the wavelength 660 nm and the wavelength 785 nm and a semiconductor laser which outputs laser lights of the wavelength of 405 nm. In this case, the diffraction grating is installed in a position where the laser lights having the three wavelengths pass in common.

In the diffraction grating 1, the optical path length difference in the wavelength 660 nm and the wavelength 785 nm is set to zero or substantially the same value as zero, and the optical path length difference in the wavelength 405 nm is set to a value which is substantially different from them. Thus, since the diffraction grating 1 transmits the lights of the wavelength 660 nm and the wavelength 785 nm and diffracts the lights of the wavelength 405 nm, image formation performance of the lights of the wavelength 405 nm to the optical disk 107 is optimized. That is, the lights of the wavelength 405 nm which transmit the diffraction grating 1 are incident to the objective lens 105, and then are focused on the information recording surface of the optical disk 107. The diffraction grating 1 is designed to diffract only the lights of the wavelength 405 nm, thereby forming a light spot which does not cause any problems in recording and reading of HD-DVDs or BDs, in accordance with the characteristics of the objective lens 105.

The diffraction grating which can be applied to the optical head device according to the present embodiment is not limited to the diffraction grating according to the first embodiment. For example, if the diffraction grating according to the fifth embodiment is used, since the lights of the wavelength 660 nm and the wavelength 785 nm are diffracted, the ±first-order diffracted lights can be generated as sub beams for tracking only with respect to the lights having these wavelengths. Further, if the diffraction grating according to the sixth embodiment is used, only the lights of the wavelength 785 nm can be generated as sub beams for tracking. In addition, if the diffraction grating according to the seventh embodiment or the eighth embodiment is used, only the lights of the wavelength 405 nm can be generated as sub beams for tracking.

Further, a diffraction grating in which two or more diffraction gratings are stacked can be used. In this case, the following effects are obtained.

If the pitch of the diffraction grating is p and the diffraction angle in a wavelength $\lambda$ is $\theta$, $\sin \theta$ is proportional to $(\lambda/p)$. Here, in a case where a monolithic semiconductor laser which outputs two or more lights having different wavelengths and a diffraction grating in which the pitches of the concave portion and the convex portion are the same are used together, it is necessary to enlarge the light receiving area of a single detector so as to compensate the difference in the diffraction angles due to the wavelengths. However, the large size of the detector causes reduction in high frequency characteristics, which may obstruct high speed reading of the optical disk. On the other hand, in a case where the light receiving surface of the detector is formed for every wavelength, there is also a possibility that a signal processing circuit is complicated due to the increase in the light receiving element. Thus, for example, a diffraction grating which diffracts the lights of the wavelength 660 nm and transmits the lights of the wavelength 405 nm and the wavelength 785 nm straight and a diffraction grating which transmits the lights of the wavelength 660 nm straight and diffracts the lights of the wavelength 405 nm and the wavelength 785 nm, are stacked. Then, if each grating pitch is optimized for use, since it is not necessary for the light receiving area of the detector to become large, the above-described problems can be solved.

Second Embodiment of Optical Head Device

Figure 13A:
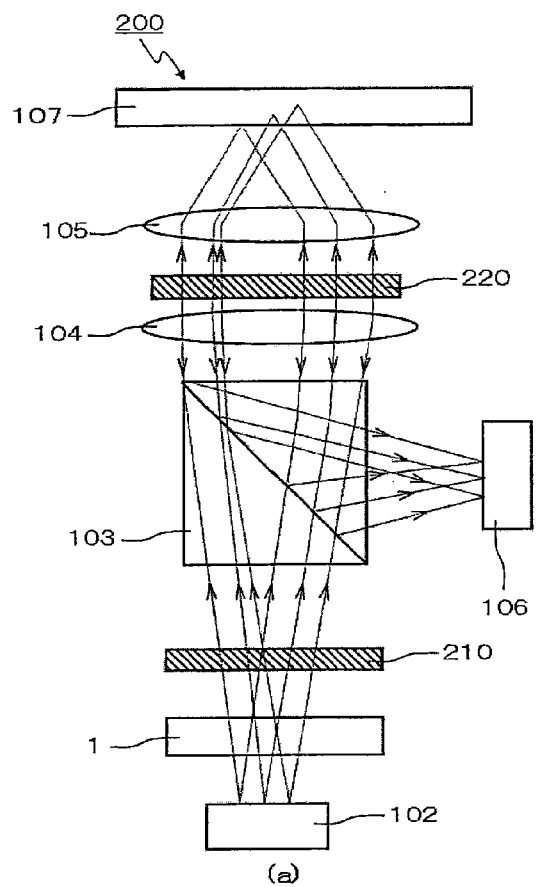
FIG. 13A is a diagram illustrating a configuration of an optical head device according to the second embodiment.
Figure 13B:
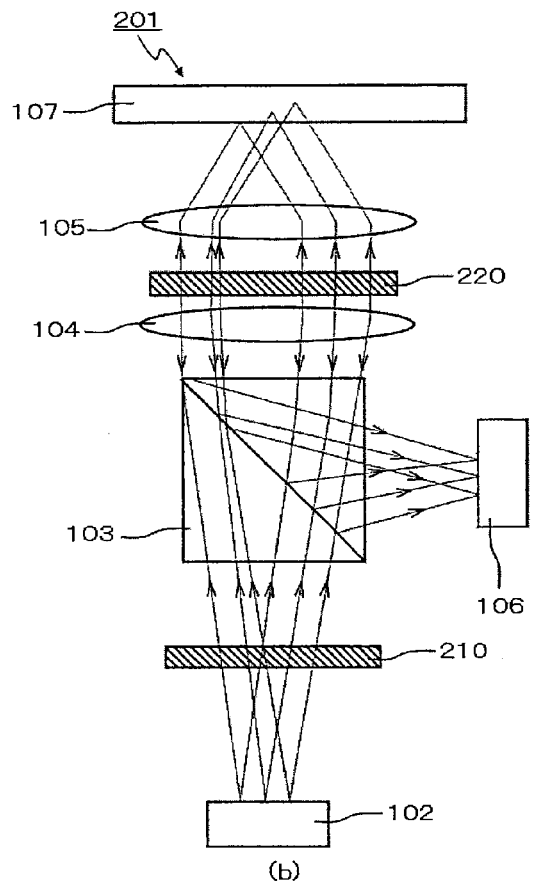
FIG. 13B is a diagram illustrating a configuration of an optical head device according to the second embodiment.

FIGS. 13A and 13B are diagrams illustrating a configuration of an optical head device according to the present embodiment. An optical head device 200 in FIG. 13A is configured so that an aberration correction element 210 and/or an aberration correction element 220 are arranged in an optical path of lights having three different wavelengths in the optical head apparatus 100, and an optical head device 201 in FIG. 13B is configured so that the diffraction grating 1 is not arranged compared with the optical head device 200. The same reference numerals are given to the same elements as in the optical head device 100, and thus, detailed description thereof will be omitted.

In the optical head devices 200 and 201, the aberration correction element can be arranged in an optical path between the light source 102 and the beam splitter 103, or an optical path between the beam splitter 103 and the objective lens 105, if the optical path is common to the lights of the wavelength 405 nm, the lights of the wavelength 660 nm, and the lights of the wavelength 785 nm. Further, according to the type of aberration to be corrected or the lights of a wavelength to be corrected, various aberration correction elements may be arranged. The invention is not limited to one aberration correction element in the optical head devices 200 and 201 and a plurality of aberration correction elements may be arranged.

The invention has been described in detail with reference to specific embodiments, but it is obvious to those who have ordinary skill in the art that a variety of modifications can be performed in a range without departing from the spirit of the invention. The present application contains subject matter related to that disclosed in Japanese Priority Patent Application JP 2008-203956 filed in the Japan Patent Office on Aug. 7, 2008, the entire contents of which are hereby incorporated by reference.

| DESCRIPTION OF REFERENCE NUMERALS AND SIGNS | |
|---|---|
| 1 | diffraction grating |
| 2, 15 | substrate |
| 3, 11, 21, 31, 41 | convex portion |
| 4, 12, 22, 32, 42 | concave portion |
| 5, 14, 24, 34, 44 | space |
| 10, 20 | astigmatism correction element |
| 30 | coma aberration correction element |
| 40 | spherical aberration correction element |
| 13, 23, 33, 43 | effective region |
| 101, 200, 201 | optical head device |
| 102 | light source |
| 103 | beam splitter |
| 104 | collimator lens |
| 105 | objective lens |
| 106 | detector |
| 107 | optical disk |
| 210, 220 | aberration correction element |

The invention claimed is:

1. An aberration correction element, comprising:
   a convex portion; and
   a concave portion,
   wherein the convex portion and the concave portion function with lights having different wavelengths $\lambda_1$, $\lambda_2$, and $\lambda_3$,
   wherein the convex portion and the concave portion are alternately disposed on at least one surface of a substrate with a predetermined pitch,
   wherein an average refractive index of the convex portion is smaller than an average refractive index of the concave portion, and
   when phase differences of the lights having the wavelengths $\lambda_1$, $\lambda_2$, and $\lambda_3$, which are transmitted through the convex portion and the concave portion are, respectively, $a_1\pi$, $a_2\pi$, and $a_3\pi$, $0 \leq |a_1 - a_2| \leq 0.2$, $0.2 < |a_3 - a_1|$, and $0.2 < |a_3 - a_2|$, are satisfied.

2. The aberration correction element of claim 1, wherein the convex portion comprises $SiO_2$ as a main component; and
   wherein the concave portion comprises $TiO_2$, $Nb_2O_5$, or $Ta_2O_5$ as a main component.

3. An optical head device, comprising:
   a light source which emits lights having three different types of wavelengths;
   the aberration correction element of claim 2;
   an objective lens which focuses the lights emitted from the light source onto an optical recording medium; and
   a detector which detects the emitted lights reflected from the optical recording medium, wherein the diffraction grating is disposed in an optical path between the light source and the objective lens.

4. The aberration correction element of claim 2, wherein the concave portion comprises $TiO_2$ as the main component.

5. The aberration correction element of claim 2, wherein the concave portion comprises $Nb_2O_5$ as the main component.

6. The aberration correction element of claim 2, wherein the concave portion comprises $Ta_2O_5$ as the main component.

7. The aberration correction element of claim 1, wherein the convex portion is a single-layer film comprising $SiO_2$ as a main component; and
wherein the concave portion is a multi-layer film in which
a first layer comprising $SiO_2$ as a main component, and
a second layer comprising $TiO_2$, $Nb_2O_5$, or $Ta_2O_5$ as a main component,
are alternately stacked.

8. The aberration correction element of claim 7, wherein the multi-layer film is an antireflection film.

9. An optical head device, comprising:
a light source which emits lights having three different types of wavelengths;
the aberration correction element of claim 8;
an objective lens which focuses the lights emitted from the light source onto an optical recording medium; and
a detector which detects the emitted lights reflected from the optical recording medium,
wherein the diffraction grating is disposed in an optical path between the light source and the objective lens.

10. An optical head device, comprising:
a light source which emits lights having three different types of wavelengths;
the aberration correction element of claim 7;
an objective lens which focuses the lights emitted from the light source onto an optical recording medium; and
a detector which detects the emitted lights reflected from the optical recording medium,
wherein the diffraction grating is disposed in an optical path between the light source and the objective lens.

11. The aberration correction element of claim 7, wherein the second layer comprises $TiO_2$ as the main component.

12. The aberration correction element of claim 7, wherein the second layer comprises $Nb_2O_5$ as the main component.

13. The aberration correction element of claim 7, wherein the second layer comprises $Ta_2O_5$ as the main component.

14. The aberration correction element of claim 1, wherein the convex portion and the concave portion are each a multi-layer film in which
a first layer comprising $SiO_2$ as a main component, and
a second layer comprising $TiO_2$, $Nb_2O_5$, or $Ta_2O_5$ as a main component,
are alternately stacked.

15. An optical head device, comprising:
a light source which emits lights having three different types of wavelengths;
the aberration correction element of claim 14;
an objective lens which focuses the lights emitted from the light source onto an optical recording medium; and
a detector which detects the emitted lights reflected from the optical recording medium,
wherein the diffraction grating is disposed in an optical path between the light source and the objective lens.

16. The aberration correction element of claim 14, wherein the second layer of at least one of the concave portion and the convex portion comprises $TiO_2$ as the main component.

17. The aberration correction element of claim 14, wherein the second layer of at least one of the concave portion and the convex portion comprises $Nb_2O_5$ as the main component.

18. The aberration correction element of claim 14, wherein the second layer of at least one of the concave portion and the convex portion comprises $Ta_2O_5$ as the main component.

19. The aberration correction element of claim 14, wherein the multi-layer film is an antireflection film.

20. An optical head device, comprising:
a light source which emits lights having three different types of wavelengths;
the aberration correction element of claim 1;
an objective lens which focuses the lights emitted from the light source onto an optical recording medium; and
a detector which detects the emitted lights reflected from the optical recording medium,
wherein the diffraction grating is disposed in an optical path between the light source and the objective lens.

* * * * *